US012513539B2

(12) United States Patent
Matsumura et al.

(10) Patent No.: US 12,513,539 B2
(45) Date of Patent: Dec. 30, 2025

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Satoshi Nagata, Tokyo (JP); Jing Wang, Beijing (CN); Lan Chen, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 338 days.

(21) Appl. No.: 18/254,018

(22) PCT Filed: Nov. 27, 2020

(86) PCT No.: PCT/JP2020/044273
§ 371 (c)(1),
(2) Date: May 23, 2023

(87) PCT Pub. No.: WO2022/113284
PCT Pub. Date: Jun. 2, 2022

(65) Prior Publication Data
US 2024/0098526 A1    Mar. 21, 2024

(51) Int. Cl.
*H04W 24/04*  (2009.01)
*H04L 5/00*  (2006.01)
*H04W 72/231*  (2023.01)

(52) U.S. Cl.
CPC .......... *H04W 24/04* (2013.01); *H04L 5/0048* (2013.01); *H04L 5/0053* (2013.01); *H04W 72/231* (2023.01)

(58) Field of Classification Search
None
See application file for complete search history.

(56) References Cited

U.S. PATENT DOCUMENTS

| | | | |
|---|---|---|---|
| 2020/0259703 A1* | 8/2020 | Cirik | H04B 7/0695 |
| 2020/0260300 A1* | 8/2020 | Cirik | H04B 7/088 |
| 2020/0350972 A1* | 11/2020 | Yi | H04W 74/0833 |
| 2020/0351674 A1 | 11/2020 | Zhou et al. | |
| 2021/0226688 A1* | 7/2021 | Khoshnevisan | H04L 5/0092 |
| 2021/0376909 A1* | 12/2021 | Khoshnevisan | H04W 36/305 |
| 2022/0085862 A1* | 3/2022 | Kung | H04W 74/0841 |
| 2022/0104036 A1* | 3/2022 | Zhou | H04W 24/04 |
| 2022/0132517 A1* | 4/2022 | Zhu | H04L 5/0051 |
| 2022/0200687 A1* | 6/2022 | Guo | H04L 5/0048 |

(Continued)

OTHER PUBLICATIONS

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

(Continued)

*Primary Examiner* — Phirin Sam
(74) *Attorney, Agent, or Firm* — Osha Bergman Watanabe & Burton LLP

(57) ABSTRACT

A terminal according to an aspect of the present disclosure includes: a receiving section that receives a configuration of a first reference signal for beam failure detection (BFD) and receives a medium access control-control element (MAC CE); and a control section that updates the first reference signal based on the MAC CE. According to an aspect of the present disclosure, it is possible to appropriately determine a BFD RS.

6 Claims, 10 Drawing Sheets

(56) References Cited

U.S. PATENT DOCUMENTS

| | | | |
|---|---|---|---|
| 2023/0006727 A1* | 1/2023 | Jang | H04L 5/0051 |
| 2023/0106244 A1* | 4/2023 | Yu | H04B 7/0695 |
| | | | 370/329 |
| 2023/0144010 A1* | 5/2023 | Kwak | H04L 5/0053 |
| | | | 370/329 |
| 2023/0198602 A1* | 6/2023 | Zeineddine | H04B 7/088 |
| | | | 370/329 |
| 2024/0030993 A1* | 1/2024 | He | H04W 76/19 |
| 2025/0141613 A1* | 5/2025 | Yi | H04L 5/0032 |

OTHER PUBLICATIONS

MediaTek Inc.; "Enhancement on multi-beam operation"; 3GPP TSG RAN WG1 #103-e, R1-2008956; e-Meeting, Oct. 26-Nov. 13, 2020 (11 pages).
International Search Report issued in PCT/JP2020/044273 on Jun. 22, 2021 (5 pages).
Written Opinion of the International Searching Authority issued in PCT/JP2020/044273 on Jun. 22, 2021 (3 pages).

\* cited by examiner

FIG. 6A

Option 2-1

| T | Serving Cell ID | BWP ID | Oct. 1 |
| R | BFD-RS ID$_1$ | | Oct. 2 |
| R | BFD-RS ID$_2$ | | Oct. 3 |

FIG. 6B

Option 2-4

| T | Serving Cell ID | BWP ID | Oct. 1 |
| A | BFD-RS ID$_1$ | | Oct. 2 |
| R | BFD-RS ID$_2$ | | Oct. 3 |

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In a universal mobile telecommunications system (UMTS) network, specifications of long term evolution (LTE) have been drafted for the purpose of further increasing data rates, providing low latency, and the like (Non Patent Literature 1). Furthermore, the specifications of LTE-Advanced (3GPP Rel. 10 to 14) have been drafted for the purpose of further increasing capacity and advancement of LTE (third generation partnership project (3GPP) release (Rel.) 8 and 9).

Successor systems to LTE (for example, also referred to as 5th generation mobile communication system (5G), 5G+ (plus), 6th generation mobile communication system (6G), New Radio (NR), or 3GPP Rel. 15 and subsequent releases) are also being studied.

CITATION LIST

Non Patent Literature

Non Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April 2010

SUMMARY OF INVENTION

Technical Problem

In the NR, it has been studied to perform a procedure for a user terminal (user equipment (UE)) to detect a beam failure (beam failure detection (BFD)) and switch to another beam (which may also be referred to as a beam failure recovery (BFR) procedure, BFR, or the like).

However, a method for determining a BFD reference signal (RS) is not clear. If the BFD RS is not appropriately determined, throughput may decrease or communication quality may deteriorate.

Therefore, an object of the present disclosure is to provide a terminal, a radio communication method, and a base station that appropriately detect a beam failure.

Solution to Problem

A terminal according to an aspect of the present disclosure includes: a receiving section that receives a configuration of a first reference signal for beam failure detection (BFD) and receives a medium access control-control element (MAC CE); and a control section that updates the first reference signal based on the MAC CE.

Advantageous Effects of Invention

According to an aspect of the present disclosure, it is possible to appropriately determine a BFD RS.

BRIEF DESCRIPTION OF DRAWINGS

FIGS. 6A and 6B are diagrams illustrating an example of a medium access control-control element (MAC CE) according to a second embodiment.

Figure 1:
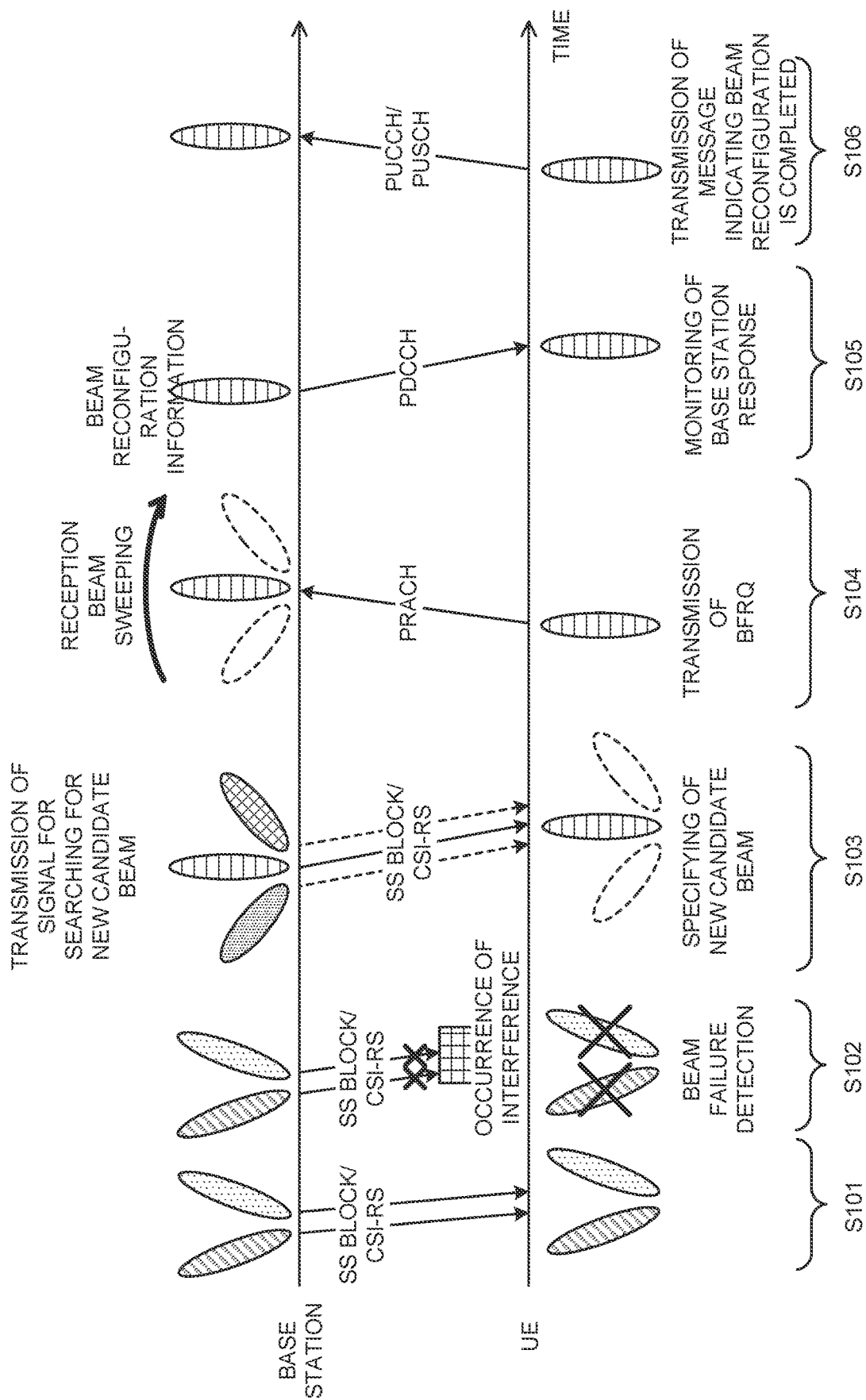
FIG. 1 is a diagram illustrating an example of a beam recovery procedure.

DESCRIPTION OF EMBODIMENTS (TCI, Spatial Relation, and QCL)

In NR, controlling reception processing (for example, at least one of reception, demapping, demodulation, and decoding) and transmission processing (for example, at least one of transmission, mapping, precoding, modulation, and coding) in a UE of at least one of a signal and a channel (expressed as a signal/channel) based on a transmission configuration indication state (TCI state) is being studied.

The TCI state may represent what is applied to a downlink signal/channel. A state corresponding to the TCI state applied to an uplink signal/channel may be expressed as a spatial relation.

The TCI state is information regarding a quasi-co-location (QCL) of the signal/channel and may also be called a spatial Rx parameter, spatial relation information, or the like. The TCI state may be configured in the UE for each channel or each signal.

The QCL is an indicator indicating a statistical property of the signal/channel. For example, this may mean that, when a given signal/channel and another signal/channel have a QCL relationship, it may be assumed that at least one of a Doppler shift, a Doppler spread, an average delay, a delay spread, and a spatial parameter (for example, the spatial Rx parameter) is the same (the QCL for at least one of the foregoing) between the plurality of different signals/channels.

Note that the spatial Rx parameter may correspond to a UE reception beam (for example, a reception analog beam), and the beam may be specified based on a spatial QCL. A QCL (or at least one element of the QCL) in the present disclosure is interchangeable with a spatial QCL (sQCL).

A plurality of types of QCL (QCL types) may be defined. In one example, four QCL types A to D of different parameters (or parameter sets) that are assumable to be same can be provided, and the parameters (also referred to as QCL parameters) are shown below:

QCL type A (QCL-A): Doppler shift, Doppler spread, average delay, and delay spread, QCL type B (QCL-B): Doppler shift and Doppler spread,
QCL type C (QCL-C): Doppler shift and average delay,
QCL type D (QCL-D): spatial Rx parameter.

It may be called a QCL assumption for the UE to assume that a given control resource set (CORESET), channel, or reference signal has a specific QCL (for example, QCL type D) relationship with another CORESET, channel, or reference signal.

Based on a TCI state of the signal/channel or the QCL assumption, the UE may also determine at least one of a transmission beam (Tx beam) and a reception beam (Rx beam) of the corresponding signal/channel.

The TCI state may be, for example, information regarding the QCL of a target channel (in other words, a reference signal (RS) for the corresponding channel) and another signal (for example, another RS). The TCI state may be configured (indicated) by higher layer signaling, physical layer signaling, or a combination thereof.

The physical layer signaling may be, for example, downlink control information (DCI).

A channel for which a TCI state or spatial relation is configured (specified) may be, for example, at least one of a physical downlink shared channel (PDSCH), a physical downlink control channel (PDCCH), a physical uplink shared channel (PUSCH), and a physical uplink control channel (PUCCH).

Furthermore, an RS having a QCL relationship with the channel may be, for example, at least one of a synchronization signal block (SSB), a channel state information reference signal (CSI-RS), a sounding reference signal (SRS), a tracking CSI-RS (also called a tracking reference signal (TRS)), and a QCL detection reference signal (also called a QRS).

The SSB is a signal block including at least one of a primary synchronization signal (PSS), a secondary synchronization signal (SSS), and a broadcast channel (physical broadcast channel (PBCH)). The SSB may be called an SS/PBCH block.

An RS of QCL type X in a TCI state may mean an RS in a QCL type X relationship with (DMRS of) a given channel/signal, and this RS may be called a QCL source of the QCL type X in the corresponding TCI state.

A QCL type A RS is always configured for the PDCCH and the PDSCH, and a QCL type D RS may be additionally configured. Since it is difficult to estimate the Doppler shift, a delay, and the like by receiving a one-shot DMRS, the QCL type A RS is used to improve channel estimation accuracy. The QCL type D RS is used for reception beam determination at the time of DMRS reception.

For example, TRSs 1-1, 1-2, 1-3, and 1-4 are transmitted, and a notification of TRS 1-1 is given as the QCL type C/D RS by the TCI state of the PDSCH. By being notified of the TCI state, the UE can use the information obtained from the results of the past periodic reception/measurement of TRS 1-1 for reception/channel estimation of a PDSCH DMRS. In this case, the QCL source of the PDSCH is TRS 1-1, and a QCL target is the PDSCH DMRS.

(Multi-TRPs)

In NR, it is considered that one or a plurality of transmission/reception points (TRPs) (multi-TRPs (MTRP)) perform DL transmission to the UE by using one or a plurality of panels (multi-panels). In addition, it is considered that the UE performs the UL transmission to one or the plurality of TRPs using one or the plurality of panels.

Note that the plurality of TRPs may correspond to the same cell identifier (ID) or may correspond to different cell IDs. The cell ID may be a physical cell ID or a virtual cell ID.

The multi-TRPs (for example, TRPs #1 and #2) are connected by an ideal/non-ideal backhaul, and information, data, and the like may be exchanged. A different codeword (CW) and a different layer may be transmitted from each TRP of the multi-TRPs. Non-coherent joint transmission (NCJT) may be used as one form of multi-TRP transmission.

In the NCJT, for example, the TRP #1 performs modulation mapping and layer mapping on a first codeword and transmits a first PDSCH by using first precoding in a first number of layers (for example, two layers). In addition, the TRP #2 performs modulation mapping and layer mapping on a second codeword and transmits a second PDSCH by using second precoding in a second number of layers (for example, two layers).

Note that a plurality of PDSCHs (multiple PDSCHs) subjected to NCJT may be defined as partially or completely overlapping with respect to at least one of a time domain or a frequency domain. That is, the first PDSCH from a first TRP and the second PDSCH from a second TRP may overlap with respect to at least one of a time resource or a frequency resource.

The first PDSCH and the second PDSCH may be assumed not to be in a quasi-co-location (QCL) relationship (not to be quasi-co-located). Reception of the multiple PDSCHs is interchangeable with the simultaneous reception of PDSCHs that are not of a given QCL type (for example, QCL type D).

The plurality of PDSCHs (which may be called multiple PDSCHs) from the multi-TRPs may be scheduled by using DCI (single DCI or single PDCCH) (single master mode or single-DCI-based multi-TRPs). The plurality of PDSCHs from the multi-TRPs may be scheduled by using Das (multiple Das or multiple PDCCHs) (multi-master mode or multi-DCI-based multi-TRP).

In URLLC for the multi-TRPs, support of PDSCH (transport block (TB) or codeword (CW)) repetition across the multi-TRPs has been studied. Support for repetition methods (URLLC schemes, for example, Schemes 1, 2a, 2b, 3, and 4) across the multi-TRPs on a frequency domain, a layer (spatial) domain, or a time domain has been studied. In Scheme 1, multiple PDSCHs from the multi-TRPs are subjected to space division multiplexing (SDM). In Schemes 2a and 2b, PDSCHs from the multi-TRPs are subjected to frequency division multiplexing (FDM). In Scheme 2a, the redundancy version (RV) is the same for the multi-TRPs. In Scheme 2b, the RVs may be the same or different for the multi-TRPs. In Schemes 3 and 4, the multiple PDSCHs from the multi-TRPs are subjected to time division multiplexing (TDM). In Scheme 3, the multiple PDSCHs from the multi-TRPs are transmitted in one slot. In Scheme 4, the multiple PDSCHs from the multi-TRPs are transmitted in different slots.

Such a multi-TRP scenario can perform more flexible transmission control using a high-quality channel.

In radio resource control (RRC) configuration information for linking a plurality of pairs of PDCCHs and PDSCHs having a plurality of TRPs, one control resource set (CORESET) in PDCCH configuration information (PDCCH-Config) may correspond to one TRP, to support intra-cell (having the same cell ID) and inter-cell (having different cell IDs) multi-TRP transmission based on the plurality of PDCCHs.

When at least one of the conditions 1 and 2 described below is satisfied, the UE may judge that it is multi-DCIbased multi-TRPs. In this case, the TRP may be replaced with a CORESET pool index.

Condition 1

A CORESET pool index of 1 is configured.

Condition 2

Two different values (for example, 0 and 1) of the CORESET pool index are configured.

When the condition described below is satisfied, the UE may judge that it is single-DCI-based multi-TRPs. In this case, two TRPs may be replaced with two TCI states indicated by the MAC CE/DCI.

Condition

In order to indicate one or two TCI states for one code point in the TCI field in the DCI, an "enhanced TCI states activation/deactivation for UE-specific PDSCH MAC CE" is used.

A DCI for common beam indication may be a UE-specific DCI format (for example, DL DCI format (for example, 1_1 and 1_2), UL DCI format (for example, 0_1 and 0_2)) or a UE-group common DCI format.

(Unified/Common TCI Framework)

According to a unified TCI framework, the UL and DL channels can be controlled by a common framework. The unified TCI framework indicates a common beam rather than defining the TCI state or the spatial relation for each channel as in Rel. 15. The common beam may be applied to all the UL and DL channels, a common beam for UL may be applied to all the UL channels, or a common beam for DL may be applied to all the DL channels.

One common beam for both DL and UL, or the common beam for DL and the common beam for UL (two common beams in total) has been considered.

The UE may assume the same TCI state (joint TCI state, joint TCI state pool, or joint common TCI state pool) for UL and DL.

The RRC may configure a plurality of TCI states (joint common TCI state pool) for both DL and UL. Each of the plurality of TCI states may be the QCL type ND RS. The SSB, the CSI-RS, or the SRS may be configured as the QCL type A/D RS. The MAC CE may activate some of the plurality of configured TCI states. The DCI may indicate at least one of the plurality of activated TCI states.

The UL and DL default beams may be aligned by beam management based on MAC CE (MAC CE level beam indication). The default TCI state of the PDSCH may be updated to match a default UL beam (spatial relation).

Beam management based on the DCI (DCI level beam indication) may indicate the common beam/unified TCI state from the same TCI state pool (joint common TCI pool) for both UL and DL. M (>1) TCI states may be activated by the MAC CE. The UL/DL DCI may select one from the M active TCI states. The selected TCI state may be applied to the channels/RSs of both UL and DL.

The UE may assume different TCI states (separate TCI state, separate TCI state pool, UL separate TCI state pool, DL separate TCI state pool, separate common TCI state pool, UL common TCI state pool, and DL common TCI state pool) for each of UL and DL.

The RRC (parameter or information element) may configure the plurality of TCI states (pools) for each of UL and DL channels.

The MAC CE may select (activate) one or more (for example, a plurality of) TCI states (sets) for each of the UL and DL channels. The MAC CE may activate two sets of TCI states.

The DL DCI may select (indicate) one or more (for example, one) TCI states. This TCI state may be applied to one or more DL channels. The DL channel may be a PDCCH/PDSCH/CSI-RS. The UE may determine the TCI state of each channel/RS of the DL by using the operation of the TCI state in Rel. 16 (TCI framework).

The UL DCI may select (indicate) one or more (for example, one) TCI states. This TCI state may be applied to one or more UL channels. The UL channel may be a PUSCH/SRS/PUCCH.

As use cases of the separate common TCI state pool, the following use cases 0, 1, and 2 have been studied.

Use Case 0

The UE uses different UL beams due to maximum permitted exposure (MPE).

Since UL using a panel #1 has the MPE problem, and the UE uses a panel #2 for UL.

Use Case 1

The UE uses different UL beams due to UL signal strength.

A distance between the UE and the TRP (a cell or a base station) #1 is longer than a distance between the UE and the TRP #2. Here, L1-RSRP of the panel #1 is higher than L1-RSRP of the panel #2, and UL transmit power of the panel #2 is higher than UL transmit power of the panel #1. The UE uses the panel #1 for DL from the TRP #1 and uses the panel #2 for UL to the TRP #2.

Use Case 2

The UE uses different UL beams due to UL load balancing.

The L1-RSRP of the panel #1 is higher than the L1-RSRP of panel #2, and a UL load of the panel #2 is lower than a UL load of the panel #1. The UE uses the panel #1 for DL from the TRP #1 and uses the panel #2 for UL to the TRP #2.

It is considered that a lot of scenarios with different requirements are studied. For example, in multi-TRP transmission, high speed train (HST) transmission, inter-cell mobility in a period of time when the UE is likely to be connected to two cells, and the like, common beams for TRPs or cells may be different.

In this case, the UE may include multi-panels for a frequency range 2 (FR2). In this case, common beams for each UE panel may be different.

In a case of the unified TCI framework, the UE may support joint TCI based on a DL TCI framework of Rel. 15/16. The TCI may include a TCI state including at least one source RS that provides a reference (UE assumption) for determination of at least one of the QCL or a spatial filter.

It is considered that the UE uses a joint TCI (joint TCI pool) including a reference to both a DL beam and a UL beam, and that the UE uses one separate TCI (pool) for DL and one separate TCI (pool) for UL.

In a case of the separate TCI pool, it is considered that the UL TCI state is obtained from the same pool as the DL TCI state and that the UL TCI state is obtained from a pool different from the DL TCI state.

In a case of the separate TCI pool, an active TCI pool for each of UL and DL may be configured/activated by the RRC/MAC CE. The active TCI pool common to UL and DL may be configured/activated by the RRC/MAC CE.

The TCI field in the DL DCI may be reused for the DCI indication of the common beam (common TCI state), or a new field (for example, the unified TCI field) in the DL DCI may be used. The DL DCI, DCI for PDSCH scheduling, and DCI formats 1_1 and 1_2 may be replaced with one another.

A new field (for example, the unified TCI field) in the UL DCI may be used for the DCI indication of the common beam (common TCI state). The UL DCI, DCI for PUSCH scheduling, and DCI formats 0_1 and 0_2 may be replaced with one another.

A feedback for the DCI indication of the common beam (common TCI state) has been considered. In a case where reception of the DCI indication of the common beam has failed, the base station erroneously recognizes the common beam. Therefore, it is considered that a timing of updating the common beam is after the UE transmits the feedback for the DCI indication. For example, in a case where the DL DCI indicates the common beam (TCI #2), the common beam is updated (to TCI #2) after the UE transmits ACK/NACK (HARQ-ACK information) on the PUCCH/PUSCH. For example, in a case where the UL DCI indicates the common beam (TCI #2), the common beam is updated (to TCI #2) after the UE transmits the PUSCH.

(Simultaneous Beam Update of Plurality of CCs)

In Rel. 16, one MAC CE can update beam indexes (TCI states) of a plurality of CCs.

The UE can have up to two applicable CC lists (for example, applicable-CC-lists) configured by RRC. When the two applicable CC lists are configured, the two applicable CC lists may respectively correspond to intra-band CA in a frequency range 1 (FR1) and intra-band CA in the FR2.

The activation MAC CE of the TCI state of the PDCCH activates the TCI state associated with the same CORESET ID on all BWPs/CCs in the applicable CC list.

The activation MAC CE of the TCI state of the PDSCH activates the TCI state on all the BWPs/CCs in the applicable CC list.

The activation MAC CE of a spatial relation of an A-SRS/SP-SRS activates the spatial relation associated with the same SRS resource ID on all BWPs/CCs in the applicable CC list.

The UE is configured with an applicable CC list indicating CCs #0, #1, #2, and #3 and a list indicating 64 TCI states for the CORESET or PDSCH of each CC. When one TCI state for CC #0 is activated by the MAC CE, the corresponding TCI state is activated in CCs #1, #2, and #3.

It has been studied that the simultaneous beam update is applicable only to a single TRP case.

For the PDSCH, the UE may be based on the following procedure A.

Procedure A

The UE receives an activation command to map up to eight TCI states to a codepoint of a DCI field (TCI field) within one CC/DL BWP or within one set of CC/BWP. When one set of TCI state IDs is activated for one set of CCs/DL BWPs, the applicable list of CCs is determined by the indicated CC in the activation command and the same set of TCI states is applied to all DL BWPs in the indicated CC. One set of TCI state IDs may be activated for one set of CCs/DL BWPs only when the UE is not provided with different values of the CORESET pool index (CORESET-PoolIndex) in CORESET information element (ControlResourceSet) or at least one TCI codepoint mapped to two TCI states.

For the PDCCH, the UE may be based on the following procedure B.

Procedure B

When the UE is provided with a list of up to two cells for simultaneous TCI state activation with a simultaneous TCI update list (at least one of simultaneousTCI-UpdateList-r16 and simultaneousTCI-UpdateListSecond-r16) by a simultaneous TCI cell list (simultaneousTCI-CellList), the UE applies an antenna port quasi co-location (QCL) provided by the TCI state having the same activated TCI state ID value to the CORESET with an index p in all configured DL BWPs of all configured cells in one list determined from a serving cell index provided by the MAC CE command. A simultaneous TCI cell list can be provided for simultaneous TCI state activation only when the UE is not provided with different values of the CORESET pool index (CORESETPoolIndex) in the CORESET information element (ControlResourceSet) or at least one TCI codepoint mapped to two TCI states.

For the semi-persistent (SP)/aperiodic (AP)-SRS, the UE may be based on the following procedure C.

Procedure C

For one set of CCs/BWPs, when spatial relation information (spatialRelationInfo) for an SP or AP-SRS resource configured by the SRS resource information element (higher layer parameter SRS-Resource) is activated/updated by the MAC CE, the applicable list of CCs is indicated by the simultaneous spatial update list (higher layer parameter simultaneousSpatial-UpdateList-r16 or simultaneousSpatial-UpdateListSecond-r16), and the spatial relation information is applied to the SP or AP-SRS resource with the same SRS resource ID in all BWPs in the indicated CC. Only when the UE is not provided with different values of the CORESET pool index (CORESETPoolIndex) in the CORESET information element (ControlResourceSet) or at least one TCI codepoint mapped to two TCI states, for one set of CCs/BWPs, the spatial relation information (spatialRelationInfo) for the SP or AP-SRS resource configured by the SRS resource information element (higher layer parameter SRS-Resource) is activated/updated by the MAC CE.

The simultaneous TCI cell list (simultaneousTCI-CellList) and simultaneous TCI update list (at least one of simultaneousTCI-UpdateList1-r16 and simultaneousTCI-UpdateList2-r16) are a list of serving cells in which the TCI relation can be simultaneously updated by using the MAC CE. SimultaneousTCl-UpdateList1-r16 and simultaneousTCI-UpdateList2-r16 do not include the same serving cell.

The simultaneous spatial update list (at least one of the higher layer parameters simultaneousSpatial-UpdatedList1-r16 and simultaneousSpatial-UpdatedList2-r16) is a list of serving cells in which the spatial relation can be simultaneously updated by using the MAC CE. SimultaneousSpatial-UpdatedList1-r16 and simultaneousSpatial-UpdatedList2-r16 do not include the same serving cell.

Here, the simultaneous TCI update list and the simultaneous spatial update list are configured by the RRC, the CORESET pool index of the CORESET is configured by the RRC, and the TCI codepoint mapped to the TCI state is indicated by the MAC CE.

(Beam Failure Recovery)

In NR, communication using beam forming has been studied. For example, a UE and a base station (for example, gNodeB (gNB)) may use a beam to be used for signal transmission (which is also referred to as a transmission beam, a Tx beam, or the like) or a beam to be used for signal reception (which is also referred to as a reception beam, an Rx beam, or the like).

In a case where beam forming is used, degradation of radio link quality is assumed because it becomes susceptible to interference by an obstacle. A radio link failure (RLF) may frequently occur due to degradation of the radio link quality. When the RLF occurs, cell re-connection is required, and thus frequent occurrence of the RLF leads to degradation of system throughput.

In the NR, to reduce occurrence of the RLF, it has been studied to perform procedure of switching to another beam (which may also be referred to as beam recovery (BR), beam failure recovery (BFR), Layer 1/Layer 2 (L1/L2) beam recovery, or the like) in a case where quality of a specific beam degrades. A BFR procedure may be simply referred to as BFR.

Note that a beam failure (BF) in the present disclosure may be referred to as a link failure, a radio link failure (RLF).

FIG. 1 is a diagram illustrating an example of a beam recovery procedure in Rel. 15 NR. The number of beams or the like is an example and is not limited thereto. In an initial state (step S101) in FIG. 1, the UE performs measurement based on a reference signal (RS) resource transmitted using two beams.

The RS may be at least one of a synchronization signal block (SSB) or a channel state information RS (CSI-RS). Note that the SSB may also be referred to as an SS/physical broadcast channel (PBCH) block, or the like.

The RS may be at least one of a primary synchronization signal (primary SS (PSS)), a secondary synchronization signal (secondary SS (SSS)), a mobility reference signal (mobility RS (MRS)), a signal included in an SSB, the SSB, a CSI-RS, a demodulation reference signal (DMRS), a beam-specific signal, or the like, or a signal constituted by extending or changing these. The RS measured in step S101 may be referred to as an RS for beam failure detection (beam failure detection RS (BFD-RS)), or the like.

In step S102, interference in radio waves from the base station occurs, whereby the UE cannot detect the BFD-RS (or reception quality of the RS is degraded). Such interference may occur due to, for example, an effect of an obstacle between the UE and the base station, fading, interference, or the like.

Once a given condition is satisfied, the UE detects a beam failure. For example, the UE may detect occurrence of a beam failure when a block error rate (BLER) is less than a threshold value for all of the configured BFD-RS (BFD-RS resource configurations). When the occurrence of the beam failure is detected, a lower layer (physical (PHY) layer) of the UE may perform notification (indication) of a beam failure instance to a higher layer (MAC layer).

Note that a criterion for determination is not limited to the BLER and may be reference signal received power in a physical layer (Layer 1 reference signal received power (L1-RSRP)). Further, instead of RS measurement or in addition to RS measurement, beam failure detection may be performed based on a downlink control channel (physical downlink control channel (PDCCH)) or the like. The BFD-RS may be expected to be in a quasi-co-location (QCL) with a DMRS of the PDCCH to be monitored by the UE.

Here, the QCL is an indicator indicating a statistical property of a channel. For example, in a case where one signal/channel and another signal/channel have a QCL relation, this may mean that it is possible to assume that between these plurality of different signals/channels, at least one of a Doppler shift, a Doppler spread, an average delay, a delay spread, or a spatial parameter (for example, spatial Rx filter/parameter, spatial Tx (transmission) filter/parameter) is the same (a QCL relation is established regarding at least one of these).

Note that the spatial Rx parameter may correspond to a UE reception beam (for example, a reception analog beam), and the beam may be specified based on a spatial QCL. The QCL (or at least one element of the QCL) in the present disclosure may be read as the spatial QCL (sQCL).

Information regarding the BFD-RS (for example, an RS index, resource, number, number of ports, precoding, or the like), information regarding beam failure detection (BFD) (for example, the above-described threshold value), or the like may be configured in (reported to) the UE by using higher layer signaling, or the like. The information regarding the BFD-RS may also be referred to as information regarding a resource for BFR, or the like.

The MAC layer of the UE may start a given timer (which may also be referred to as a beam failure detection timer) in a case where a beam failure instance notification is received from the PHY layer of the UE. The MAC layer of the UE may trigger BFR (for example, start any one of random access procedures to be described later) after receiving the beam failure instance notification a given number of times (for example, beam FailureInstanceMaxCount configured by RRC) or more before the timer expires.

The base station may determine that the UE has detected a beam failure in a case where there is no notification from the UE (for example, a period during which there is no notification exceeds a given period) or in a case where a given signal (beam recovery request in step S104) is received from the UE.

In step S103, the UE starts a search for a new candidate beam to be newly used for communication for beam recovery. The UE may measure a given RS to select a new candidate beam corresponding to the RS. The RS measured in step S103 may be referred to as a new candidate beam identification RS (NCBI-RS), a CBI-RS, a candidate beam RS (CB-RS), or the like. The NCBI-RS may be the same as or different from the BFD-RS. Note that the new candidate beam may be referred to as a new candidate beam, a candidate beam, or a new beam.

The UE may determine a beam corresponding to an RS that satisfies a given condition as a new candidate beam. The UE may determine a new candidate beam based on, for example, an RS whose L1-RSRP exceeds a threshold value among configured NCBI-RSs. Note that a criterion for determination is not limited to L1-RSRP. The determination may be made using at least any one of L1-RSRP, L1-RSRQ, or L1-SINR (signal to noise interference power ratio). L1-RSRP regarding an SSB may also be referred to as SS-RSRP. L1-RSRP regarding a CSI-RS may also be referred to as CSI-RSRP. Similarly, L1-RSRQ regarding an SSB may also be referred to as SS-RSRQ. L1-RSRQ regarding a CSI-RS may also be referred to as CSI-RSRQ. Further, similarly, L1-SINR regarding an SSB may be referred to as SS-SINR. L1-SINR regarding a CSI-RS may be referred to as CSI-SINR.

Information regarding an NCBI-RS (for example, an RS resource, number, number of ports, precoding, or the like), information regarding new candidate beam identification (NCBI) (for example, the above-described threshold value), or the like, may be configured in (reported to) the UE using higher layer signaling, or the like. The information regarding the NCBI-RS may be acquired based on the information regarding the BFD-RS. The information regarding the NCBI-RS may also be referred to as information regarding an NCBI resource, or the like.

Note that the BFD-RS, NCBI-RS, or the like, may be read as a radio link monitoring reference signal (RLM-RS).

In step S104, the UE that has specified the new candidate beam transmits a beam failure recovery request (BFRQ). The beam recovery request may also be referred to as a beam recovery request signal, a beam failure recovery request signal, or the like.

The BFRQ may be transmitted using, for example, a physical random access channel (PRACH). The BFRQ may include information on the new candidate beam specified in step S103. A resource for the BFRQ may be associated with the new candidate beam. Notification of the information on the beam may be performed using, for example, a beam index (BI), a port index of a given reference signal, a resource index (for example, CSI-RS resource indicator (CRI), SSB resource indicator (SSBRI)), or the like.

In Rel. 15 NR, contention based BFR (CB-BFR) which is BFR based on contention based random access (CBRA) procedure and contention-free BFR (CF-BFR) which is BFR based on contention-free random access (CFRA) procedure are supported. In the CB-BFR or the CF-BFR, the UE may transmit a preamble (which is also referred to as an RA preamble, a physical random access channel (PRACH), an RACH preamble, or the like) as the BFRQ by using a PRACH resource.

Note that the CF-BFR may also be referred to as CFRA BFR. The CB-BFR may also be referred to as CBRA BFR. The CFRA procedure and the CFRA may be replaced with each other. The CBRA procedure and the CBRA may be replaced with each other.

In step S105, the base station that has detected the BFRQ transmits a response signal (which may also be referred to as a "BFR response", "gNB response", or the like) for the BFRQ from the UE. The response signal may include reconfiguration information (for example, DL-RS resource configuration information) for one or more beams.

The response signal may be transmitted in, for example, a UE common search space of a PDCCH. The notification of the response signal may be performed by using a PDCCH (DCI) having a cyclic redundancy check (CRC) scrambled by an identifier (for example, a cell radio network temporary identifier (C-RNTI)) of the UE. The UE may determine at least one of a transmission beam or a reception beam to be used, based on beam reconfiguration information.

The UE may monitor the response signal based on at least one of a control resource set (CORESET) for BFR or a search space set for BFR. For example, the UE may detect the DCI with the CRC scrambled with the C-RNTI in the BFR search space in a CORESET that is individually configured.

For the CB-BFR, contention resolution may be determined to be successful in a case where the UE receives a PDCCH corresponding to the C-RNTI regarding the UE itself.

Regarding the processing of step S105, a period for the UE to monitor a response from the base station (for example, gNB) to the BFRQ may be configured. The period may also be referred to as, for example, a gNB response window, a gNB window, a beam recovery request response window, a BFRQ response window, or the like. The UE may retransmit the BFRQ in a case where no gNB response is detected within the window period.

In step S106, the UE may transmit a message indicating that beam reconfiguration is completed to the base station. The message may be transmitted by the PUCCH or PUSCH, for example.

In step S106, the UE may receive RRC signaling indicating a configuration of a transmission configuration indication state (TCI state) to be used for the PDCCH or may receive an MAC CE indicating activation of the configuration.

Beam recovery success (BR success) may represent a case where the processing reaches step S106, for example. On the other hand, beam recovery failure (BR failure) may correspond to, for example, a case where the number of times of BFRQ transmission has reached a given number, or a beam-failure-recovery-timer has expired.

Note that numbers of these steps are merely numbers for description, and a plurality of these steps may be combined, or the order of these steps may be changed. Further, whether or not to perform BFR may be configured in the UE by using higher layer signaling.

(BFD-RS)

In Rel. 16, for each BWP of one serving cell, the UE may be provided with a set $q_0$ bar of periodic (P)-CSI-RS resource configuration indexes by failure detection resources (failureDetectionResources) and at least one set qi bar of P-CSI-RS resource configuration indexes or SS/PBCH block indexes by a candidate beam RS list (candidateBeamRSList) or an extended candidate beam RS list (candidateBeamRSListExt-r16) or a candidate beam RS list for an SCell (candidateBeamRSSCellList-r16).

The $q_0$ bar is a notation in which an overline is added to "$q_0$". Hereinafter, the $q_0$ bar will be simply denoted as $q_0$. The qi bar is a notation in which an overline is added to "qi". Hereinafter, the qi bar will be simply denoted as qi.

The set $q_0$ of P-CSI-RS resources provided by the failure detection resources may be referred to as an explicit BFD-RS.

The UE may perform L1-RSRP measurement, or the like, by using the RS resource corresponding to the index included in the at least one set of the set $q_0$ or the set qi and detect a beam failure.

Note that, in the present disclosure, providing the above higher layer parameter indicating information on an index corresponding to BFD resources may be read as, for example, configuring the BFD resources and configuring the BFD-RS. In the present disclosure, the BFD resources, the set $q_0$ of periodic CSI-RS resource configuration indexes or SSB indexes, and the BFD-RS may be replaced with one another.

If the UE is not provided with $q_0$ for one BWP of its serving cell by its failure detection resources (failureDetectionResources), it is determined to include in the set $q_0$ a P-CSI-RS resource configuration index with the same value as the RS index in the RS set specified by the TCI state (TCI-State) for the corresponding CORESET that the UE uses for PDCCH monitoring. If there are two RS indexes in one TCI state, the set $q_0$ includes RS indexes with QCL type D configuration for the corresponding TCI state. The UE assumes that the set $q_0$ includes up to two RS indexes. The UE assumes a single port RS in the set $q_0$.

The set $q_0$ may be referred to as an implicit BFD-RS.

The physical layer in the UE evaluates the radio link quality according to the set $q_0$ of resource configurations for a threshold $Q_{out,LR}$. For the set $q_0$, the UE evaluates the radio link quality according to the P-CSI-RS resource configuration that is in QCL with a DM-RS of PDCCH reception monitored by the UE, or an SS/PBCH block on a PCell or PSCell that is in QCL with a DM-RS of PDCCH reception monitored by the UE.

In other words, the BFD-RS is in QCL with the PDCCH regardless of the implicit or explicit BFD-RS.

Regarding the BFR, the UE may follow at least one of the following operation 1 (BFR for the SCell) or 2 (BFR for the SpCell).

Operation 1

The UE may be provided with the configuration for PUCCH transmission with a link recovery request (LRR) via a scheduling RequestIDForBFR. The UE may transmit at least one MAC CE (BFR MAC CE) that provides one index to at least one corresponding SCell with worse radio link quality than $Q_{out,LR}$ on the first PUSCH. This index is the index q new for the P-CSI-RS configuration or SS/PBCH block provided by the higher layer for the corresponding SCell if configured. After 28 symbols from the last symbol of specific PDCCH reception, the UE may follow at least one of the following operation 1-1 or 1-2. The specific PDCCH reception schedules PUSCH transmission with the same HARQ process number as transmission of the first PUSCH and has a DCI format with a toggled new data indicator (NDI) field value.

Operation 1-1

The UE monitors PDCCHs in all CORESETs on the SCell specified by the MAC CE with the same antenna port QCL parameters, if any, as the antenna port QCL parameters associated with the corresponding index q new.

Operation 1-2

In a case where the following conditions 1 to 3 are satisfied, the UE transmits the PUCCH on the PUCCH-SCell by using the same spatial domain filter as the spatial domain filter corresponding to the index q new and using power with $q_u=0$, $q_d=q_{new}$, and I=0 in a transmit power formula.

[[[Condition 1]]] The UE is provided with PUCCH spatial relation information (PUCCH-SpatialRelationInfo) for the PUCCH.
[[[Condition 2]]] The PUCCH with LRR has not been transmitted or has been transmitted on the PCell or PSCell.
[[[Condition 3]]] The PUCCH-SCell is included in the SCell specified by the MAC CE.

Here, a subcarrier spacing (SCS) configuration for the 28 symbols is a minimum value of the SCS configuration of the active DL BWP for PDCCH reception and the SCS configuration of the active DL BWP for at least one SCell.

Note that q new may be an index of a new candidate beam (for example, an SSB/CSI-RS) selected by the UE in the BFR procedure and reported on a corresponding PRACH to a network (or an index of a new beam found in the BFR procedure).

In a normal case, q u may be a PUCCH PO ID (p0-PUCCH-Id) indicating PO for a PUCCH (PO-PUCCH) in a PUCCH PO set (p0-Set). I may be referred to as an index of a power control adjustment state, an index of a PUCCH power control adjustment state, a closed loop index, or the like. $q_d$ may be an index (for example, configured by PUCCH-PathlossReferenceRS) of a path-loss reference RS.

Operation 2

The UE may receive a PRACH transmission configuration (PRACH-ResourceDedicatedBFR). For PRACH transmission according to the antenna port QCL parameters associated with the P-CSI-RS resource configuration or SS/PBCH block associated with the index q new provided by the higher layer in a slot n, the UE monitors the specific PDCCH. The specific PDCCH is a PDCCH in the search space set provided by the recovery search space ID (recoverySearchSpace Id) for detection of the DCI format with the CRC scrambled by the C-RNTI or the MCS-C-RNTI starting from a slot n+4 in a window configured by the beam failure recovery configuration (Beam FailureRecoveryConfig). For PDCCH monitoring in the search space set provided by the recovery search space ID and corresponding PDSCH reception, the UE assumes the same antenna port QCL parameters as the antenna port QCL parameters associated with the index q new until the UE receives activation by the higher layer on the TCI state or at least one parameter of the TCI state addition list for PDCCH (tci-StatesPDCCH-ToAddList) or the TCI state release list for PDCCH (tci-StatesPDCCH-ToReleaseList).

The UE may follow the next operation 2-1.

Operation 2-1

After the UE detects the DCI format with the CRC scrambled by the C-RNTI or the MCS-C-RNTI in the search space set provided by the recovery search space ID, the UE continues to monitor the PDCCH candidates in the search space set provided by the recovery search space ID until the UE receives an MAC CE activation command for the TCI state or at least one of the TCI state addition list for PDCCH or the TCI state release list for PDCCH.

For the BFR for the PCell/SCell (SpCell/SCell) based on the CBRA/CFRA procedure, the BFD-RS may or does not have to be explicitly configured by the RRC. In a case where the BFD-RS is not configured, the UE assumes a periodic (P)-CSI-RS or SSB that is a PDCCH and a QCL type D as a BFD-RS. In Rel. 15/16, the UE can monitor up to two BFD-RSs.

In Rel. 15/16, the UE continues to monitor the explicitly configured BFD-RS (explicit BFD-RS) until the BFD-RS is reconfigured or deactivated by the RRC. In a case where the BFD-RS is explicitly configured by the RRC, the BFR may occur again if the UE performs the BFD using the BFD-RS even after the BFD occurs and the BFR is completed.

For example, in a case where a P-CSI-RS #1 is configured as the BFD-RS by the RRC and the BFR is executed, a beam different from the P-CSI-RS #1 (the TCI state in which the P-CSI-RS #1 is configured as the QCL type D) is considered to be used for the PDCCH after the BFR. According to the current specification, measurement of the BFD after the BFR is performed using the P-CSI-RS #1 configured before the BFR. In other words, even in a case where quality of actual communication is good, the BFR may be executed again (repeatedly) because the BFD is performed using the BFD-RS not related to the quality of communication.

Thus, in a case where the explicit BFD-RS is configured before the beam failure of the SCell for the operation 1, it is considered that the UE stops the explicit BFD-RS monitoring after receiving the SCell BFR response. For example, in a case where at least one of the above-mentioned operation 1-1 or 1-2 is performed, the UE performs the following operation 1-3.

Operation 1-3

In a case where the set $q_0$ is provided by a higher layer parameter failure detection resource (failureDetectionResource) or a beam failure detection resource list (BeamFailureDetectionResourceList, failureDetectionResourcesToAddModList), the UE stops monitoring the set $q_0$.

In addition, for the operation 2, in a case where an explicit BFD-RS is configured before the beam failure of the SpCell, it is considered that the UE stops the explicit BFD-RS monitoring after receiving the SpCell BFR response. For example, it is considered that the UE performs the next operation 2-2 instead of the above-mentioned operation 2-1.

Operation 2-2

After the UE detects the DCI format with the CRC scrambled by the C-RNTI or the MCS-C-RNTI in the search space set provided by the recovery search space ID, the UE continues to monitor the PDCCH candidates in the search space set provided by the recovery search space ID until the UE receives an MAC CE activation command for the TCI state or at least one of the TCI state addition list for PDCCH or the TCI state release list for PDCCH, and in a case where the set $q_0$ is provided by the failure detection resource (failureDetectionResource), the UE stops monitoring the set $q_0$.

Extension related to beam management for simultaneous multi-TRP transmission using multi-panel reception is considered.

In a case of using the implicit BFD-RS configuration, the following options 1 and 2 are considered.

Option 1

A BFD-RS set k may be derived from the QCL type D RS of the TCI state of the CORESET configured in a CORESET subset k. For example, k is 0 or 1. In a case where the QCL type D RS is not configured, the BFD-RS set k may be derived from the QCL type A of the TCI state of the CORESET configured in the CORESET subset k. This option may be applied to the single-DCI-based multi-TRPs and the multi-DCI-based multi-TRPs.

Option 2

The BFD-RS set k may be derived from the QCL type D RS of the TCI state of the CORESET configured in a CORESET pool index k. For example, k is 0 or 1. In a case where the QCL type D RS is not configured, the BFD-RS set k may be derived from the QCL type A of the TCI state of the CORESET configured in the CORESET pool index k. This option may be applied to multi-DCI-based multi-TRPs.

The option 2 is preferred for the multi-DCI-based multi-TRPs. However, for the single-DCI-based multi-TRPs, there may be no CORESET subset configuration (the CORESET subset configuration is similar to that for the multi-DCI-based multi-TRPs). In this case, the option 1 is not applied.

Extension related to beam management for simultaneous multi-TRP transmission using multi-panel reception is considered.

Whether or not per-TRP BFR (per-TRP based beam failure recovery) for the single-DCI/multi-DCI-based multi-TRPs is supported has been studied. In enabling the per-TRP BFR, extension of a base station (for example, gNB) response, a UE operation of QCL/spatial relation assumption/UL power control for a DL and UL channel/RS after reception of the base station response, and the like become problematic.

In the BFR procedure for multi-panels/multi-TRPs, a plurality of sets (configurations) of BFD-RSs are considered for the single-DCI-based multi-TRPs and the multi-DCI-based multi-TRPs.

For the single-DCI-based multi-TRPs, it has been considered that the BFD-RS is determined implicitly when the per-TRP BFR is configured by RRC and the BFD-RS is not explicitly configured.

As described above, it is necessary that the BFD-RS is in QCL with the PDCCH (the TCI state of the CORESET). However, for the explicit BFD-RS, based on existing standards, in a case where the TCI state of the CORESET is updated by the MAC CE (TCI state indication for UE-specific PDCCH MAC CE), the network (NW) needs to reconfigure the BFD-RS by RRC, which causes latency and overhead.

Therefore, the present inventors have conceived a method of updating the BFD RS.

Hereinafter, embodiments according to the present disclosure will be described in detail with reference to the drawings. The radio communication method according to each of the embodiments may be applied independently, or may be applied in combination with others.

In the present disclosure, "A/B/C" and "at least one of A, B and C" may be replaced with each other. In the present disclosure, a cell, a serving cell, a CC, a carrier, a BWP, a DL BWP, a UL BWP, an active DL BWP, an active UL BWP, and a band may be replaced with one another. In the present disclosure, an index, an ID, an indicator, and a resource ID may be replaced with one another. In the present disclosure, "support", "control", "controllable", "operate", and "operable" may be replaced with one another.

In the present disclosure, "configure", "activate", "update", "indicate", "enable", "specify", and "select" may be replaced with one another.

In the present disclosure, the higher layer signaling may be any of, for example, radio resource control (RRC) signaling, medium access control (MAC) signaling, broadcast information, or the like, or a combination thereof. In the present disclosure, the RRC, the RRC signaling, the RRC parameter, the higher layer, the higher layer parameter, the RRC information element (IE), and the RRC message may be replaced with one another.

For example, a MAC Control Element (MAC CE), a MAC Protocol Data Unit (PDU), or the like may be used for the MAC signaling. The broadcast information may be, for example, a Master Information Block (MIB), a System Information Block (SIB), Remaining Minimum System Information (RMSI), Other System Information (OSI), or the like.

In the present disclosure, MAC CE and activation/deactivation command may be replaced with each other.

In the present disclosure, a beam, a spatial domain filter, a spatial setting, a TCI state, a UL TCI state, a unified TCI state, a unified beam, a common TCI state, a common beam, TCI assumption, QCL assumption, a QCL parameter, a spatial domain reception filter, a UE spatial domain reception filter, a UE reception beam, a DL beam, a DL reception beam, DL precoding, a DL precoder, a DL-RS, a QCL type D RS of TCI state/QCL assumption, a QCL type A RS of the TCI state/QCL assumption, a spatial relation, a spatial domain transmission filter, a UE spatial domain transmission filter, a UE transmission beam, a UL beam, a UL transmission beam, UL precoding, a UL precoder, and a PL-RS may be replaced with one another. In the present disclosure, a QCL type X-RS, a DL-RS associated with QCL type X, a DL-RS with QCL type X, a DL-RS source, the SSB, the CSI-RS, and the SRS may be replaced with one another.

In the present disclosure, the panel, the uplink (UL) transmission entity, the TRP, the spatial relation, the control resource set (CORESET), the PDSCH, the codeword, the base station, the antenna port (for example, a demodulation reference signal (DMRS) port) of a signal, the antenna port group (for example, a DMRS port group) of a signal, the group for multiplexing (for example, a code division multiplexing (CDM) group, a reference signal group, and a CORESET group), the CORESET pool, the CORESET subset, the CW, the redundancy version (RV), and the layer (MIMO layer, transmission layer, and spatial layer) may be replaced with one another. Further, a panel identifier (ID) and the panel may be replaced with each other. In the present disclosure, the TRP ID, the TRP-related ID, the CORESET pool index, the location (ordinal number, first TCI state or second TCI state) of one TCI state of two TCI states corresponding to one codepoint of a field in the DCI, and the TRP may be replaced with one another.

In the present disclosure, the TRP, the transmission point, the panel, the DMRS port group, the CORESET pool, and one of two TCI states associated with one codepoint of a TCI field may be replaced with one another.

In the present disclosure, a single TRP, a single TRP system, single TRP transmission, and a single PDSCH may be replaced with one another. In the present disclosure, the multi-TRPs, the multi-TRPs system, the multi-TRP transmission, and the multiple PDSCHs may be replaced with one another. In the present disclosure, the single DCI, the single PDCCH, the single-DCI-based multi-TRPs, and activation of two TCI states on at least one TCI codepoint may be replaced with one another.

In the present disclosure, the single TRP, a channel using the single TRP, a channel using one TCI state/spatial relation, the fact that the multi-TRPs are not enabled by the RRC/DCI, the fact that a plurality of TCI states/spatial relations are not enabled by the RRC/DCI, and the fact that a CORESET pool index (CORESETPoolIndex) value of 1 is not configured for any CORESET and no codepoint in the TCI field is mapped to two TCI states may be replaced with one another.

In the present disclosure, the multi-TRPs, a channel using the multi-TRPs, a channel using the plurality of TCI states/spatial relations, the fact that the multi-TRPs are enabled by the RRC/DCI, the fact that the plurality of TCI states/spatial relations are enabled by the RRC/DCI, and at least one of the single-DCI-based multi-TRPs and the multi-DCIs-based multi-TRPs may be replaced with one another. In the present disclosure, the multi-DCIs-based multi-TRPs and the fact that the CORESET pool index (CORESETPoolIndex) value of 1 is configured for the CORESET may be replaced with each other. In the present disclosure, the single-DCI-based multi-TRPs and the fact that at least one codepoint of the TCI field is mapped to two TCI states may be replaced with one another.

In the present disclosure, the TRP #1 (first TRP) may correspond to the CORESET pool index=0 or may correspond to the first TCI state of two TCI states corresponding to one codepoint of the TCI field. The TRP #2 (second TRP) and the TRP #1 (first TRP) may correspond to the CORE-SET pool index=1 or may correspond to the second TCI state of two TCI states corresponding to one codepoint of the TCI field.

In the present disclosure, a DMRS, a DMRS port, and an antenna port may be replaced with one another.

UL DCI, DCI for scheduling a UL channel (for example, the PUSCH), and a DCI format 0_x (x=0, 1, 2, . . . ) may be replaced with each other. DL DCI, DCI for scheduling a DL channel (PDSCH), and a DCI format 1_x (x=0, 1, 2, . . . ) may be replaced with each other.

In the present disclosure, a link direction, downlink (DL), uplink (UL), and one of UL and DL may be replaced with one another.

In the present disclosure, a pool, a set, a group, and a list may be replaced with one another.

In the present disclosure, the common beam, the common TCI, the common TCI state, the unified TCI, the unified TCI state, the TCI state applicable to DL and UL, the TCI state applied to a plurality of (a plurality of types of) channels/RSs, the TCI state applicable to a plurality of types of channels/RSs, and the PL-RS may be replaced with one another.

In the present disclosure, a plurality of TCI states configured by the RRC, a plurality of TCI states activated by the MAC CE, a pool, a TCI state pool, an active TCI state pool, a common TCI state pool, a joint TCI state pool, a separate TCI state pool, a common TCI state pool for the UL, a common TCI state pool for the DL, a common TCI state pool configured/activated by an RRC/MAC CE, and TCI state information may be replaced with one another.

In the present disclosure, the CC list, a serving cell list, the CC list in a cell group configuration (CellGroupConfig), the applicable list, the simultaneous TCI update list/second simultaneous TCI update list, the simultaneousTCI-UpdateList1-r16/simultaneousTCI-UpdateList2-r16, the simultaneous TCI cell list, the simultaneousTCI-CellList, the simultaneous spatial update list/second simultaneous spatial update list, the simultaneousSpatial-UpdatedList1-r16/simultaneousSpatial-UpdatedList2-r16, the configured CC, the configured list, the BWP/CC in the configured list, all the BWPs/CCs in the configured list, the CC indicated by the activation command, the indicated CC, the CC that has received the MAC CE, and the information indicating the plurality of cells for updating at least one of the TCI state and the spatial relation may be replaced with one another.

In the present disclosure, the BFR, the BFR configuration, the BFD-RS, and the BFD-RS configuration may be replaced with one another. In the present disclosure, the per-cell BFR, the cell-specific BFR, and the BFR of Rel. 15/16 may be replaced with one another. In the present disclosure, the per-TRP BFR, TRP-specific BFR, the BFR of Rel. 17, and BFR after Rel. 17 may be replaced with one another.

(Radio Communication Method)

Two sets of BFD-RSs (BFD-RS sets) may be configured for the single-DCI-based multi-TRPs. The two BFD-RS sets may be associated with two TRPs respectively. The two BFD-RS sets may be configured by RRC. Each BFD-RS set may include one or more BFD-RSs. In a case where a plurality of CORESETs are configured for one TRP, a plurality of BFD-RSs in a BFD-RS set corresponding to the TRP may be respectively associated (or in QCL) with the plurality of CORESETs. In a case where a plurality of CORESETs are configured for one TRP, one BFD-RS in one BFD-RS set may be associated (or in QCL) with the plurality of CORESETs.

The UE may receive a configuration of a BFD-RS (first reference signal for BFD), receive an MAC CE, and update the BFD-RS based on the MAC CE. The MAC CE may be a TCI state indication for UE-specific PDCCH MAC CE or may be a new MAC CE.

First Embodiment

In a case where a BFD-RS is configured by RRC and is in QCL with a CORESET i, and a TCI state of the CORESET i is updated by an MAC CE (alternatively, common TCI associated with the CORESET i is updated by the MAC CE), the BFD-RS may be automatically updated to a P-CSI-RS or SSB indicated (or associated with an RS in the TCI state of the CORESET i) in the TCI state of the CORESET i. In a case where there are two RSs in the TCI state, the P-CSI-RS or SSB may correspond to the QCL type D RS.

The update of the BFD-RS may be applied to both a per-cell (cell-specific) BFD-RS configuration (Rel. 15/16) and a per-TRP BFD-RS configuration (Rel. 17 and subsequent releases), or may be applied to both single-DCI-based per-TRP BFR and multi-DCI-based per-TRP BFR.

Figure 2:
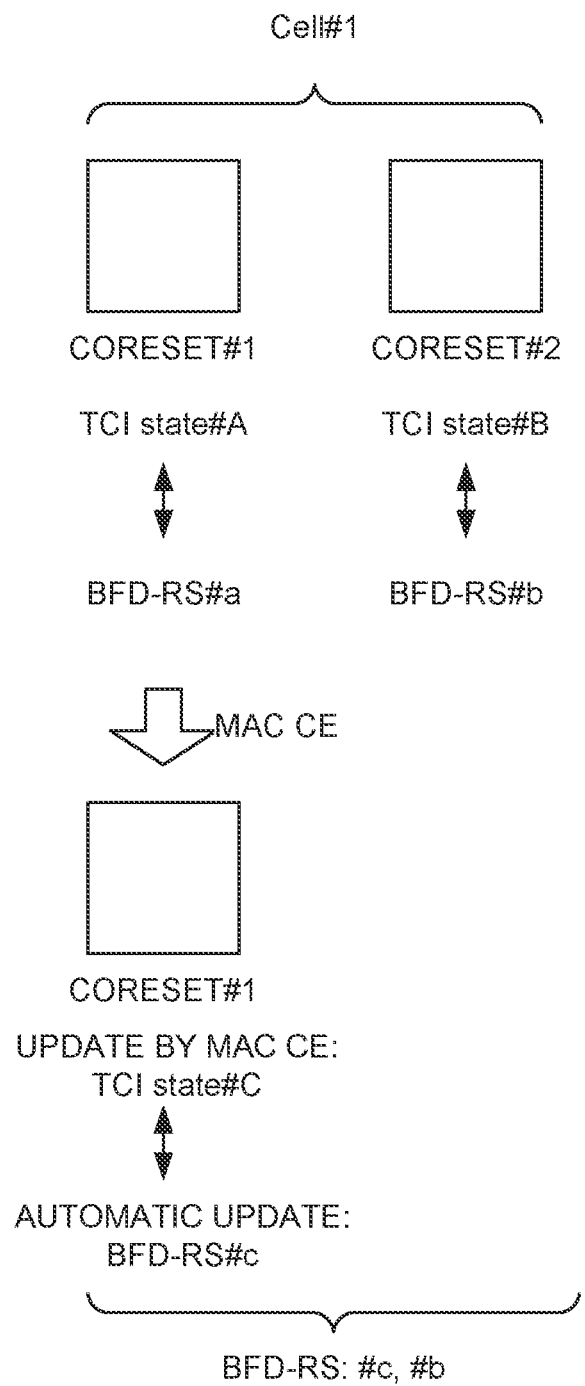
FIG. 2 is a diagram illustrating an example of a per-cell beam failure detection reference signal (BFD-RS) configuration.

FIG. 2 illustrates an example of the per-cell BFD-RS configuration. In this example, CORESETs #1 and #2 are configured for a cell #1, a TCI state #A is indicated for the CORESET #1, and a TCI state #B is indicated for the CORESET #2. Further, a BFD-RS #a that is in QCL with the CORESET #1 and a BFD-RS #b that is in QCL with the CORESET #2 are configured. At this time, the BFD-RSs for the cell #1 are the BFD-RSs #a and #b.

In a case where the TCI state of the CORESET #1 of the cell #1 is updated to a TCI state #C by the MAC CE, the BFD-RS corresponding to the CORESET is automatically updated to a BFD-RS #c which is an (associated) RS included in the updated TCI state #C. At this time, the BFD-RSs for the cell #1 are the BFD-RSs #c and #b.

Figure 3:
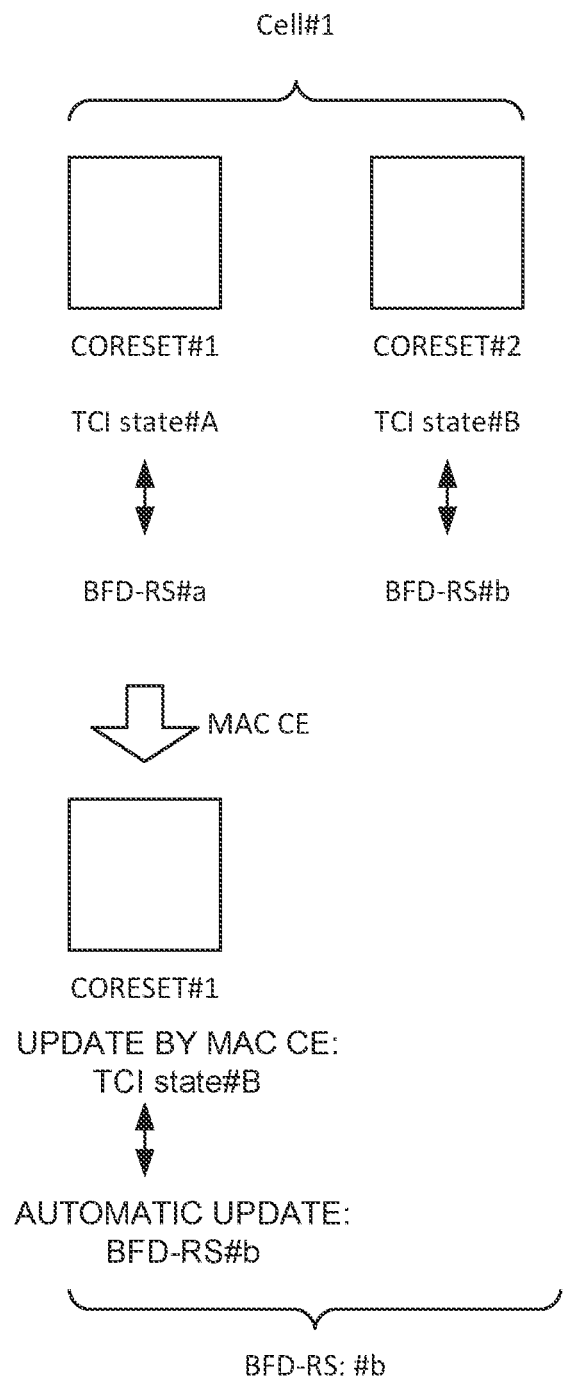
FIG. 3 is a diagram illustrating another example of the per-cell BFD-RS configuration.

FIG. 3 illustrates another example of the per-cell BFD-RS configuration. In this example, CORESETs #1 and #2 are configured for a cell #1, a TCI state #A is indicated for the CORESET #1, and a TCI state #B is indicated for the CORESET #2. Further, a BFD-RS #a that is in QCL with the CORESET #1 and a BFD-RS #b that is in QCL with the CORESET #2 are configured. At this time, the BFD-RSs for the cell #1 are the BFD-RSs #a and #b.

In a case where the TCI state of the CORESET #1 of the cell #1 is updated to the TCI state #B by the MAC CE, the BFD-RS corresponding to the CORESET is automatically updated to the BFD-RS #b which is an (associated) RS included in the TCI state #B. At this time, the BFD-RS for the cell #1 is the BFD-RS #b. In this manner, the BFD-RS may be updated to one BFD-RS.

Figure 4:
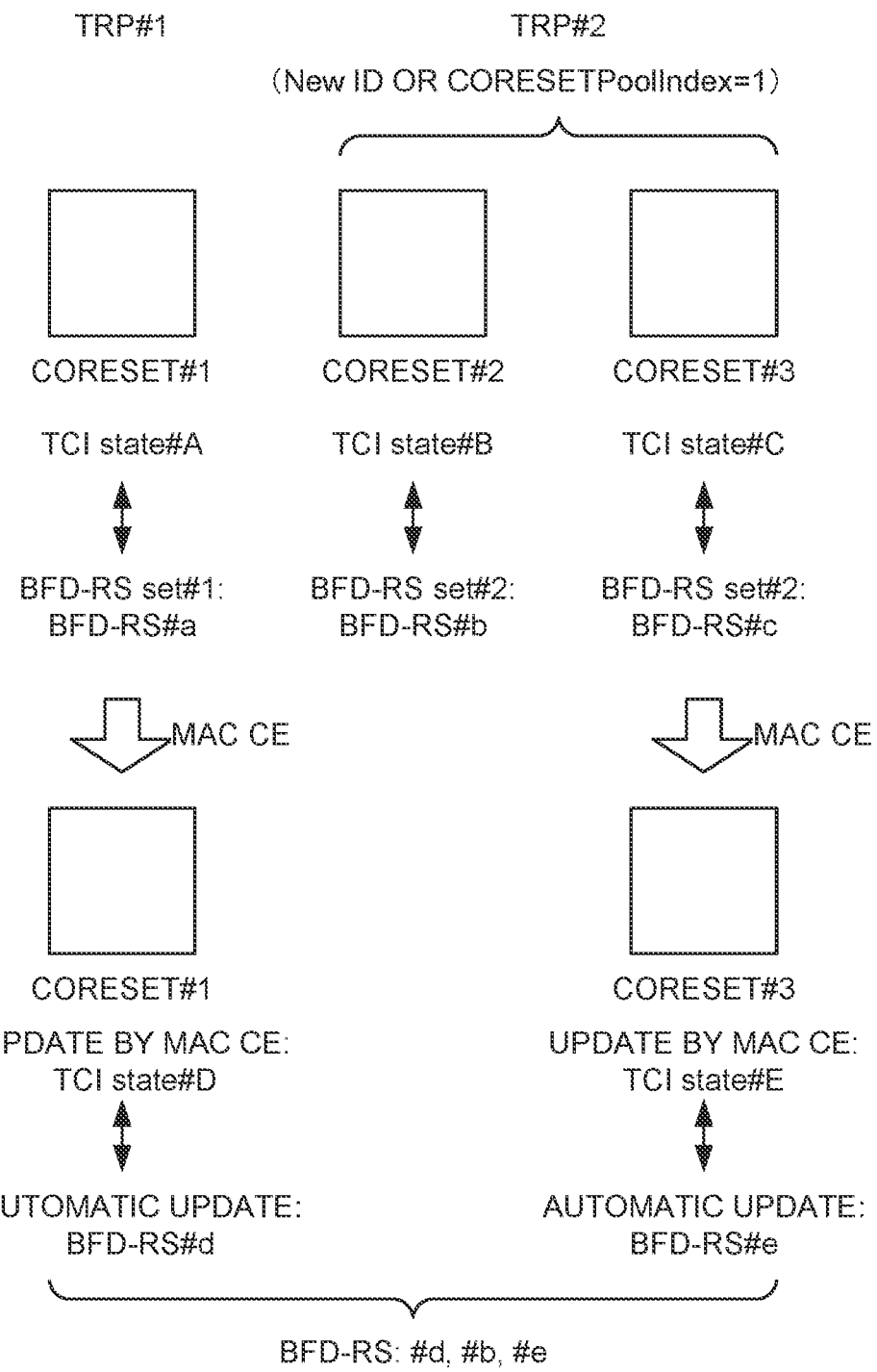
FIG. 4 is a diagram illustrating an example of a per-transmission/reception point (TRP) BFD-RS configuration.

FIG. 4 illustrates an example of the per-TRP BFD-RS configuration. This BFD-RS configuration may be applied to both the single-DCI-based multi-TRPs and the multi-DCI-based multi-TRPs. In this example, the CORESET #1 is configured for the TRP #1, the CORESETs #2 and #3 are configured for the TRP #2, the TCI state #A is indicated for the CORESET #1, the TCI state #B is indicated for the CORESET #2, and the TCI state #C is indicated for the CORESET #3. The TRP #2 may be associated with a new ID or a CORESET pool index=1. Further, a BFD-RS set #1 including the BFD-RS #a that is in QCL with the CORESET #1 is configured, and a BFD-RS set #2 including the BFD-RS #b that is in QCL with the CORESET #2 and the BFD-RS #c that is in QCL with the CORESET #3 is configured. The BFD-RS set #1 may be associated with the TRP #1. The BFD-RS set #2 may be associated with the TRP #2. At this time, the BFD-RSs are the BFD-RS #a, #b, and #c.

In a case where the TCI state of the CORESET #1 is updated to the TCI state #D by the MAC CE, the BFD-RS corresponding to the CORESET is automatically updated to the BFD-RS #c which is an (associated) RS included in the TCI state #C. In a case where the TCI state of the CORESET #3 is updated to a TCI state #E by the MAC CE, the BFD-RS corresponding to the CORESET is automatically updated to a BFD-RS #e which is an (associated) RS included in the TCI state #E. At this time, the BFD-RSs for the TRPs #1 and #2 are the BFD-RSs #d, #b, and #e. The number of BFD-RSs may exceed two, which is a limit in Rel. 15/16.

In a case where the TCI state of the CORESET i is updated by the MAC CE, the updated TCI state and the original TCI state (before update) may belong to the same TRP (may be associated with the same new ID, the same CORESET pool index, or the same TRP-related ID).

In a case where the number of BFD-RSs per BFD-RS set is limited and TCI states of a plurality of CORESETs corresponding to the same BFD-RS in the same BFD-RS set are updated, the plurality of TCI states updated for those CORESETs may be any of the following options 1-1 and 1-2.

Option 1-1

The plurality of TCI states are the same TCI state.

Figure 5:
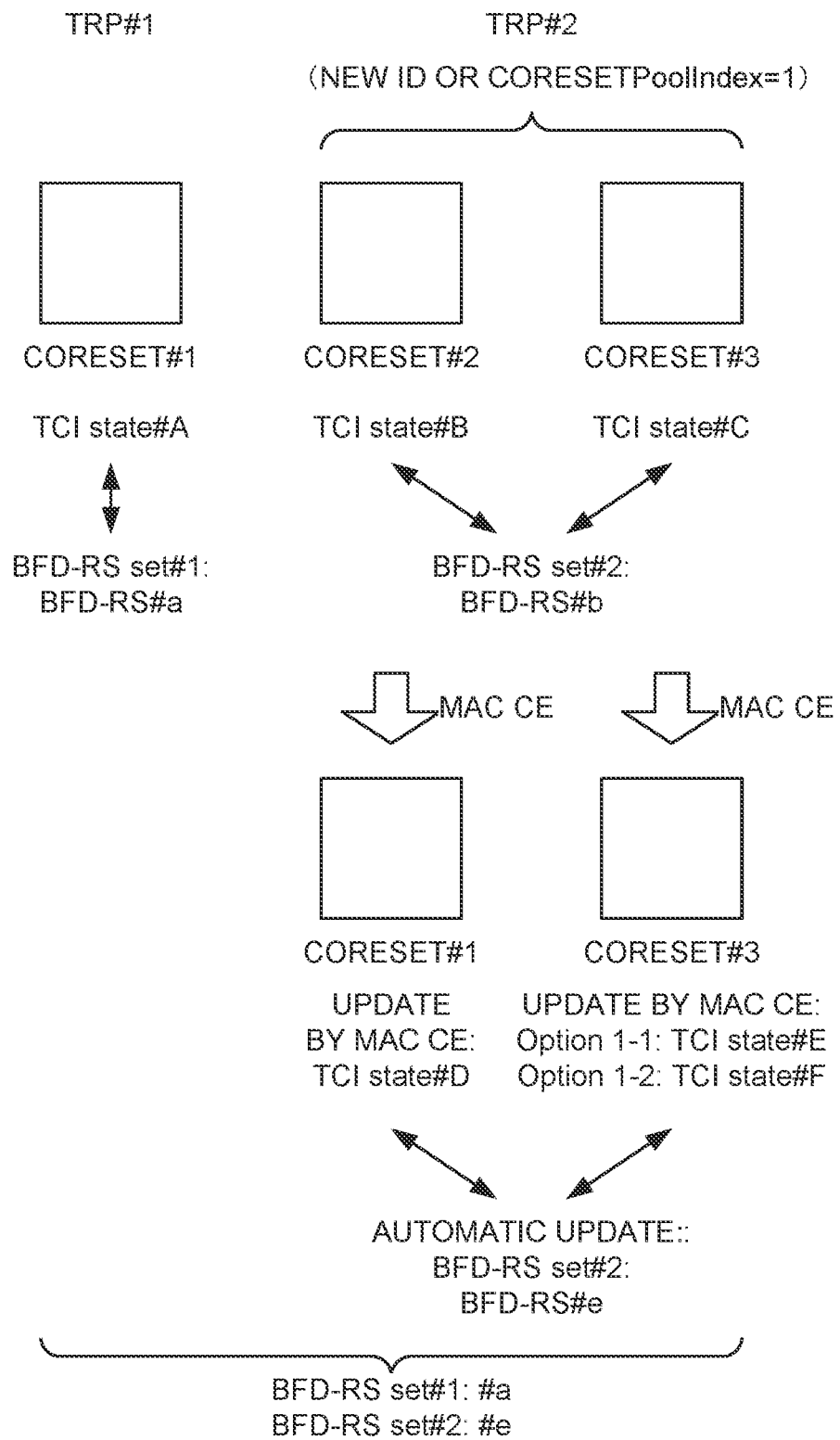
FIG. 5 is a diagram illustrating another example of the per-TRP BFD-RS configuration.

FIG. 5 illustrates another example of the per-TRP BFD-RS configuration. This BFD-RS configuration may be applied to both the single-DCI-based multi-TRPs and the multi-DCI-based multi-TRPs. In this example, the CORESET #1 is configured for the TRP #1, the CORESETs #2 and #3 are configured for the TRP #2, the TCI state #A is indicated for the CORESET #1, the TCI state #B is indicated for the CORESET #2, and the TCI state #C is indicated for the CORESET #3. The TRP #2 may be associated with a new ID or a CORESET pool index=1. Further, the BFD-RS set #1 including the BFD-RS #a that is in QCL with the CORESET #1 is configured, and the BFD-RS set #2 including the BFD-RS #b that is in QCL with the CORESETs #2 and #3 is configured. The BFD-RS set #1 may be associated with the TRP #1. The BFD-RS set #2 may be associated with the TRP #2. At this time, the BFD-RSs are the BFD-RSs #a and #b.

In the example of the option 1-1 of FIG. 5, the TCI states of the CORESETs #2 and #3 are updated to the TCI state #E by the MAC CE. In this case, the BFD-RSs corresponding to the CORESETs are automatically updated to the BFD-RS #e which is an (associated) RS included in the TCI state #E. At this time, the BFD-RSs for the TRPs #1 and #2 are the BFD-RS #a in the BFD-RS set #1 and the BFD-RS #e in the BFD-RS set #2.

Option 1-2

The plurality of TCI states are associated/are in QCL with the same BFD-RS.

In the example of the option 1-2 of FIG. 5, the TCI state of the CORESET #2 is updated to the TCI state #E by the MAC CE, and the TCI state of the CORESET #3 is updated to a TCI state #F by the MAC CE. In this case, the BFD-RSs corresponding to the CORESETs are automatically updated to the BFD-RS #e which is the same RS associated with the TCI states of the CORESETs (the same RS that is in QCL with the CORESETs). At this time, the BFD-RSs for the TRPs #1 and #2 are the BFD-RS #a in the BFD-RS set #1 and the BFD-RS #e in the BFD-RS set #2.

According to the embodiment, even in a case where the TCI state of the CORESET that is in QCL with the BFD-RS is updated, the UE can determine the BFD-RS appropriately.

Second Embodiment

A new MAC CE for updating a BFD-RS may be defined. The MAC CE may have a new logical channel ID (LCID). The new MAC CE may be applied to different cases than the TCI state indication for UE-specific PDCCH MAC CE.

The new MAC CE may be according to at least one of the following options 2-1 to 2-7.

For the per-cell BFR, the new MAC CE may be according to any of the following options 2-1 to 2-3.

Option 2-1

The MAC CE includes one or two BFD-RS fields, one serving cell ID field, and one BWP ID field. The MAC CE is applied to the indicated serving cell/BWP.

FIG. 6A illustrates an example of an MAC CE according to the option 2-1. This example assumes one BFD-RS for each TRP. The MAC CE includes a T field, a serving cell ID field, a BWP ID field, a first R (reserved bit) field, a first BFD-RS ID (BFD-RS IN field, a first R field, and a second BFD-RS ID (BFD-RS ID$_2$) field.

The T field may indicate whether the second BFD-RS field exists.

Each BFD-RS field may be accompanied with a flag for identifying whether a CSI-RS resource ID or an SSB ID is indicated.

Option 2-2

The MAC CE includes one or two BFD-RS fields, one serving cell ID field, and one BWP ID field. A CC list is configured by RRC, and the MAC CE is applied to a plurality of CCs in the CC list that includes the indicated serving cell. This means that the MAC CE performs simultaneous BFD-RS update for the plurality of CCs, and the plurality of CCs use the same BFD-RS.

Option 2-3

The MAC CE includes one or more sets. Each set includes one or two BFD-RS fields, one serving cell ID field, and one BWP ID field. One or more sets indicate different serving cell IDs. This means that the MAC CE can update different BFD-RSs for a plurality of CCs.

For the per-TRP BFR, the new MAC CE may be according to any of the following options 2-4 to 2-6.

Option 2-4

The MAC CE includes one or two BFD-RS fields, one serving cell ID field, and one BWP ID field for each TRP. The MAC CE may or does not have to include a field of a TRP-ID/new ID/CORESET pool index associated with the TRP. The MAC CE is applied to the indicated serving cell/BWP.

FIG. 6B illustrates an example of an MAC CE according to the option 2-4. This example assumes one BFD-RS for each TRP. The MAC CE includes a T field, a serving cell ID field, a BWP ID field, an A field, a first BFD-RS ID field, an R field, and a second BFD-RS ID field.

The T field may indicate whether there is one BFD-RS field (T=0) or two BFD-RS fields (T=1) or whether the MAC CE is for one TRP (T=0) or for two MAC CEs (T=1).

Each BFD-RS field may be accompanied with a flag for identifying whether a CSI-RS resource ID or an SSB ID is indicated.

The A field may indicate information regarding the TRP of the BFD-RS in a case where there is one BFD-RS field (T=0) in the MAC CE. For example, in a case where there is only one BFD-RS field in the MAC CE, the A field may indicate the TRP-ID/new ID/CORESET pool index corresponding to the BFD-RS field.

Option 2-5

The MAC CE includes one or two BFD-RS fields, one serving cell ID field, and one BWP ID field for each TRP. The MAC CE may or does not have to include a field of a TRP-ID/new ID/CORESET pool index associated with the TRP. A CC list is configured by RRC, and the MAC CE is applied to a plurality of CCs in the CC list that includes the indicated serving cell. This means that the MAC CE performs simultaneous BFD-RS update for the plurality of CCs, and the plurality of CCs use the same BFD-RS.

In this case, the per-TRP BFR may be configured for all CCs configured in the CC list.

Option 2-6

The MAC CE includes one or more sets. Each set includes one or two BFD-RS fields, one serving cell ID field, and one BWP ID field for each TRP. Each set may or does not have to include a field of a TRP-ID/new ID/CORESET pool index associated with the TRP. One or more sets indicate different serving cell IDs. This means that the MAC CE can update different BFD-RSs for a plurality of CCs for which the per-TRP BFR is configured.

The new MAC CE may be according to the following option 2-7.

Option 2-7

The MAC CE may include a BFD-RS for a cell for which the per-cell BFR is configured, or may include a BFD-RS for a cell for which the per-TRP BFR is configured. The MAC CE may be a combination of the options 2-3 and 2-6.

In a case where there is a field of a TRP-ID/new ID/CORESET pool index associated with a TRP in the MAC CE for the cell for which the per-TRP BFR is configured, it becomes clear which TRP of which cell each BFD-RS field is applied to. This means that the MAC CE can update a BFD-RS for only one TRP for the cell and maintain BFD-RSs for other TRPs for the cell.

In a case where there is no field of TRP-ID/new ID/CORESET pool index associated with the TRP in the MAC CE for the cell for which the per-TRP BFR is configured, this means that the MAC CE needs to update a BFD-RS for two TRPs simultaneously for the cell, and the MAC CE may be according to the following options 2-7-1 and 2-7-2.

Option 2-7-1

In the MAC CE for each cell/BWP, a new flag may be required to indicate whether the MAC CE is for the per-cell BFD-RS or for the per-TRP BFD-RS (with two sets of BFD-RS fields).

Option 2-7-2

In the MAC CE for each cell/BWP, the new flag does not have to be required. Whether the MAC CE is for the per-cell BFD-RS or for the per-TRP BFD-RS may depend on a BFR configuration for the cell or may be implicitly indicated by RRC for the BFR configuration.

According to the embodiment, even in a case where the BFD RS is not explicitly configured, the UE can determine the BFD RS appropriately.

Third Embodiment

A UE capability corresponding to at least one function (feature) in the first and second embodiments may be defined. In a case where the UE has reported the UE capability, the UE may perform the corresponding function. In a case where the UE has reported the UE capability and is configured with a higher layer parameter corresponding to this function, the UE may perform the corresponding function. The higher layer parameter (RRC information element) corresponding to this function may be defined. In a case where the higher layer parameter is configured, the UE may perform the corresponding function.

The UE capability may indicate whether the UE supports this function.

The UE capability may indicate whether or not automatic BFD-RS update for a serving cell based on TCI state update for a CORESET via an MAC CE is supported for at least one of the BFR of Rel.15/16 (per-cell BFR) or the BFR of Rel. 17 and subsequent releases (per-TRP BFR).

The UE capability may indicate whether to support automatic BFD-RS update for a plurality of serving cells at the same time based on TCI state update for a CORESET via an MAC CE for at least one of the BFR of Rel.15/16 (per-cell BFR) or the BFR of Rel. 17 and subsequent releases (per-TRP BFR).

The UE capability may indicate whether or not BFD-RS update for a serving cell based on a new MAC CE is supported for at least one of the BFR of Rel.15/16 (per-cell BFR) or the BFR of Rel. 17 and subsequent releases (per-TRP BFR).

The UE capability may indicate whether or not BFD-RS update for a plurality of serving cells at the same time based on a new MAC CE is supported for at least one of the BFR of Rel.15/16 (per-cell BFR) or the BFR of Rel. 17 and subsequent releases (per-TRP BFR).

According to the embodiment, the UE can implement the above functions while maintaining compatibility with existing specifications.

(Radio Communication System)

Hereinafter, a configuration of a radio communication system according to one embodiment of the present disclosure will be described. In this radio communication system, communication is performed by using any one of or a combination of the radio communication methods according to the above-described embodiments of the present disclosure.

Figure 7:
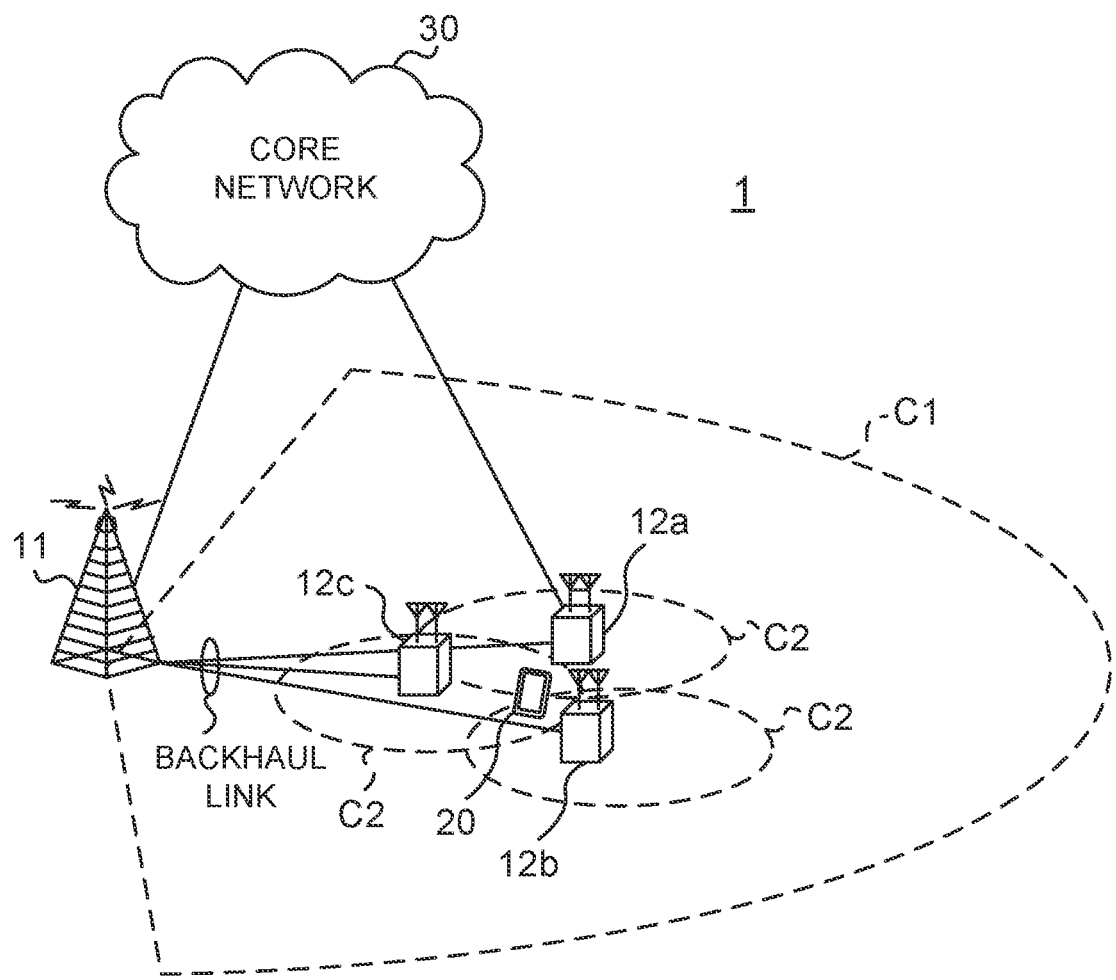
FIG. 7 is a diagram illustrating an example of a schematic configuration of a radio communication system according to one embodiment.

FIG. 7 is a diagram illustrating an example of a schematic configuration of the radio communication system according to one embodiment. A radio communication system 1 may be a system that implements communication using long term evolution (LTE), 5th generation mobile communication system New Radio (5G NR), and the like drafted as the specification by third generation partnership project (3GPP).

Further, the radio communication system 1 may support dual connectivity (multi-RAT dual connectivity (MR-DC)) between a plurality of radio access technologies (RATs). The MR-DC may include dual connectivity between LTE (evolved universal terrestrial radio access (E-UTRA)) and NR (E-UTRA-NR dual connectivity (EN-DC)), dual connectivity between NR and LTE (NR-E-UTRA dual connectivity (NE-DC)), and the like.

In EN-DC, an LTE (E-UTRA) base station (eNB) is a master node (MN), and an NR base station (gNB) is a secondary node (SN). In the NE-DC, an NR base station (gNB) is the MN, and an LTE (E-UTRA) base station (eNB) is the SN.

The radio communication system 1 may support dual connectivity between a plurality of base stations in the same RAT (for example, dual connectivity in which both the MN and the SN are NR base stations (gNB) (NR-NR dual connectivity (NN-DC)).

The radio communication system 1 may include a base station 11 that forms a Macro cell C1 with a relatively wide coverage, and base stations 12 (12a to 12c) disposed in the Macro cell C1, each of which forms a Small cell C2 narrower than the Macro cell C1. A user terminal 20 may be positioned in at least one cell. The arrangement, number, and the like of cells and the user terminals 20 are not limited to the aspects illustrated in the drawings. Hereinafter, the base stations 11 and 12 will be collectively referred to as a "base station 10", unless these base stations are distinguished from each other.

The user terminal 20 may be connected to at least one of the plurality of base stations 10. The user terminal 20 may use at least one of carrier aggregation (CA) using a plurality of component carriers (CC) and dual connectivity (DC).

Each CC may be included in at least one of a first frequency range (frequency range 1 (FR1)) and a second frequency range (frequency range 2 (FR2)). The macro cell C1 may be included in the FR1, and the small cell C2 may be included in the FR2. For example, the FR1 may be a frequency range of 6 GHz or less (sub-6 GHz), and the FR2 may be a frequency range higher than 24 GHz (above-24 GHz). Note that frequency ranges, definitions, or the like of the FR1 and the FR2 are not limited to these, and, for example, the FR1 may correspond to a higher frequency range than the FR2.

Further, the user terminal 20 may perform communication in each CC by using at least one of Time Division Duplex (TDD) and Frequency Division Duplex (FDD).

The plurality of base stations 10 may be connected in a wired (e.g., an optical fiber or an X2 interface in compliance with common public radio interface (CPRI)) or wireless manner (e.g., NR communication). For example, in a case where NR communication is used as a backhaul between the base stations 11 and 12, the base station 11 corresponding to a higher-level station may be referred to as an integrated access backhaul (IAB) donor, and the base station 12 corresponding to a relay station (relay) may be referred to as an IAB node.

The base station 10 may be connected to a core network 30 via another base station 10 or directly. The core network 30 may include, for example, at least one of an Evolved Packet Core (EPC), a 5G Core Network (5GCN), or a Next Generation Core (NGC), or the like.

The user terminal 20 may be a terminal corresponding to at least one of communication methods such as LTE, LTE-A, or 5G.

In the radio communication system 1, a radio access scheme based on orthogonal frequency division multiplexing (OFDM) may be used. For example, in at least one of downlink (DL) or uplink (UL), cyclic prefix OFDM (CP- OFDM), discrete Fourier transform spread OFDM (DFT-s-OFDM), orthogonal frequency division multiple access (OFDMA), single carrier frequency division multiple access (SC-FDMA), and the like, may be used.

A radio access method may also be referred to as a waveform. Note that, in the radio communication system 1, another radio access method (for example, another single carrier transmission method or another multi-carrier transmission method) may be used as a radio access method for the UL or the DL.

In the radio communication system 1, as a downlink channel, a physical downlink shared channel (PDSCH), a physical broadcast channel (PBCH), a physical downlink control channel (PDCCH), or the like, shared by the user terminals 20 may be used.

Further, in the radio communication system 1, as an uplink channel, a physical uplink shared channel (PUSCH), a physical uplink control channel (PUCCH), a physical random access channel (PRACH), or the like, shared by the user terminals 20 may be used.

User data, higher layer control information, a system information block (SIB), and the like are transmitted on the PDSCH. The user data, higher layer control information, and the like may be transmitted on the PUSCH. Furthermore, a master information block (MIB) may be transmitted on the PBCH.

Lower layer control information may be transmitted by the PDCCH. The lower layer control information may include, for example, Downlink Control Information (DCI) including scheduling information of at least one of the PDSCH or the PUSCH.

Note that DCI that schedules a PDSCH may also be referred to as DL assignment, DL DCI, or the like, and DCI that schedules a PUSCH may also be referred to as a UL grant, UL DCI, or the like. Note that a PDSCH may be replaced with DL data, and a PUSCH may be replaced with UL data.

For detection of the PDCCH, a control resource set (CORESET) and a search space may be used. The CORESET corresponds to a resource that searches for DCI. The search space corresponds to a search area and a search method for PDCCH candidates. One CORESET may be associated with one or more search spaces. The UE may monitor a CORESET associated with a given Search Space based on a Search Space configuration.

One search space may correspond to a PDCCH candidate corresponding to one or more aggregation levels. One or more search spaces may be referred to as a search space set. Note that "Search Space", "Search Space set", "Search Space configuration", "Search Space set configuration", "CORESET", "CORESET configuration", and the like in the present disclosure may be replaced with one another.

Uplink Control Information (UCI) including at least one of Channel State Information (CSI), delivery acknowledgement information (which may be referred to as, for example, a hybrid automatic repeat request acknowledgement (HARQ-ACK), ACK/NACK, or the like), or a Scheduling Request (SR) may be transmitted by the PUCCH. A random access preamble for establishing connection with a cell may be transmitted on the PRACH.

Note that, in the present disclosure, downlink, uplink, or the like may be expressed without "link". Furthermore, various channels may be expressed without adding "Physical" to the beginning thereof.

In the radio communication system 1, a synchronization signal (SS), a downlink reference signal (DL-RS), and the like, may be transmitted. In the radio communication system 1, a Cell-Specific Reference Signal (CRS), a Channel State Information Reference Signal (CSI-RS), a DeModulation Reference Signal (DMRS), a Positioning Reference Signal (PRS), a Phase Tracking Reference Signal (PTRS), or the like, may be transmitted as the DL-RS.

The synchronization signal may be, for example, at least one of a Primary Synchronization Signal (PSS) and a Secondary Synchronization Signal (SSS). A signal block including the SS (PSS or SSS) and the PBCH (and the DMRS for the PBCH) may be referred to as an SS/PBCH block, an SS block (SSB), or the like. Note that, the SS, the SSB, or the like may also be referred to as a reference signal.

Furthermore, in the radio communication system 1, a measurement reference signal (sounding reference signal (SRS)), a demodulation reference signal (DMRS), or the like may be transmitted as an uplink reference signal (UL-RS). Note that, DMRS may be referred to as a UE-specific reference signal.

(Base Station)

Figure 8:
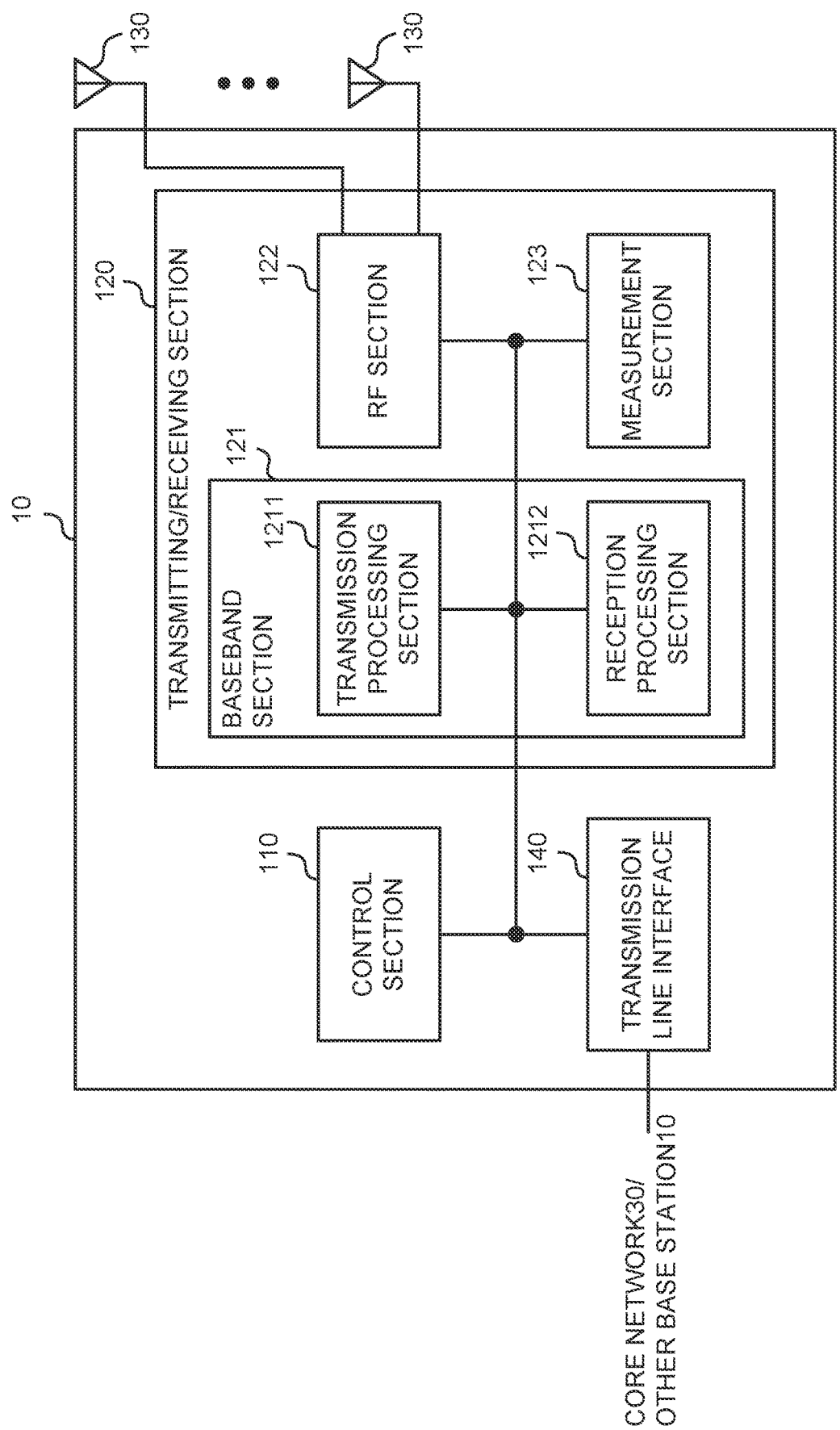
FIG. 8 is a diagram illustrating an example of a configuration of a base station according to one embodiment.

FIG. 8 is a diagram illustrating an example of a configuration of the base station according to one embodiment. The base station 10 includes a control section 110, a transmitting/receiving section 120, a transmitting/receiving antenna 130, and a transmission line interface 140. Note that one or more control sections 110, one or more transmitting/receiving sections 120, one or more transmitting/receiving antennas 130, and one or more transmission line interfaces 140 may be included.

Note that, although this example mainly describes a functional block which is a characteristic part of the present embodiment, the base station 10 may be assumed also to have another functional block that is necessary for radio communication. Part of processing of each section described below may be omitted.

The control section 110 controls an entire base station 10. The control section 110 can include a controller, a control circuit, or the like, which is described based on common recognition in a technical field according to the present disclosure.

The control section 110 may control signal generation, scheduling (for example, resource allocation or mapping), or the like. The control section 110 may control transmission/reception, measurement, and the like using the transmitting/receiving section 120, the transmitting/receiving antenna 130, and the transmission line interface 140. The control section 110 may generate data to be transmitted as a signal, control information, a sequence, and the like, and may forward the data, the control information, the sequence, and the like to the transmitting/receiving section 120. The control section 110 may perform call processing (such as configuration or releasing) of a communication channel, management of a state of the base station 10, management of a radio resource, or the like.

The transmitting/receiving section 120 may include a baseband section 121, a radio frequency (RF) section 122, and a measurement section 123. The baseband section 121 may include a transmission processing section 1211 and a reception processing section 1212. The transmitting/receiving section 120 can include a transmitter/receiver, an RF circuit, a base band circuit, a filter, a phase shifter, a measurement circuit, a transmission/reception circuit, or the like, which is described based on common recognition in a technical field according to the present disclosure.

The transmitting/receiving section 120 may be constituted as an integrated transmitting/receiving section, or may be constituted by a transmitting section and a receiving section. The transmitting section may include the transmission processing section 1211 and the RF section 122. The receiving section may include the reception processing section 1212, the RF section 122, and the measurement section 123.

The transmitting/receiving antenna 130 can include an antenna, for example, an array antenna, or the like, which is described based on common recognition in a technical field according to the present disclosure.

The transmitting/receiving section 120 may transmit the above-described downlink channel, synchronization signal, Downlink Reference Signal, or the like. The transmitting/receiving section 120 may receive the above-described uplink channel, Uplink Reference Signal, or the like.

The transmitting/receiving section 120 may form at least either a transmission beam or a reception beam by using digital beam forming (for example, precoding), analog beam forming (for example, phase rotation), or the like.

The transmitting/receiving section 120 (transmission processing section 1211) may perform packet data convergence protocol (PDCP) layer processing, radio link control (RLC) layer processing (for example, RLC retransmission control), medium access control (MAC) layer processing (for example, HARQ retransmission control), and the like, on, for example, data, control information, and the like, acquired from the control section 110, to generate a bit string to be transmitted.

The transmitting/receiving section 120 (transmission processing section 1211) may perform transmission processing such as channel encoding (which may include error correcting encoding), modulation, mapping, filtering processing, Discrete Fourier Transform (DFT) processing (if necessary), Inverse Fast Fourier Transform (IFFT) processing, precoding, or digital-analog conversion on the bit string to be transmitted, to output a baseband signal.

The transmitting/receiving section 120 (RF section 122) may perform modulation to a radio frequency range, filtering processing, amplification, or the like on the baseband signal, and may transmit a signal in the radio frequency band via the transmitting/receiving antenna 130.

Meanwhile, the transmitting/receiving section 120 (RF section 122) may perform amplification, filtering processing, demodulation to a baseband signal, or the like on the signal in the radio frequency range received by the transmitting/receiving antenna 130.

The transmitting/receiving section 120 (reception processing section 1212) may apply reception processing such as analog-digital conversion, fast Fourier transform (FFT) processing, inverse discrete Fourier transform (IDFT) processing (if necessary), filtering processing, demapping, demodulation, decoding (which may include error correction decoding), MAC layer processing, RLC layer processing, or PDCP layer processing on the acquired baseband signal, to acquire user data, and the like.

The transmitting/receiving section 120 (measurement section 123) may perform measurement on the received signal. For example, the measurement section 123 may perform radio resource management (RRM), channel state information (CSI) measurement, and the like based on the received signal. The measurement section 123 may measure received power (for example, reference signal received power (RSRP)), received quality (for example, reference signal received quality (RSRQ), a signal to interference plus noise ratio (SINR), a signal to noise ratio (SNR)), signal strength (for example, received signal strength indicator (RSSI)), propagation path information (for example, CSI), and the like. The measurement result may be outputted to the control section 110.

The transmission line interface 140 may transmit/receive a signal (backhaul signaling) to and from an apparatus included in the core network 30, another base stations 10, or the like, and may acquire, transmit, or the like user data (user plane data), control plane data, or the like for the user terminal 20.

Note that a transmitting section and a receiving section of the base station 10 in the present disclosure may include at least one of the transmitting/receiving section 120, the transmitting/receiving antenna 130, or the transmission line interface 140.

The transmitting/receiving section 120 may transmit a configuration of a first reference signal for beam failure detection (BFD) and may transmit a medium access control-control element (MAC CE). The control section 110 may update the first reference signal based on the MAC CE.

(User Terminal)

Figure 9:
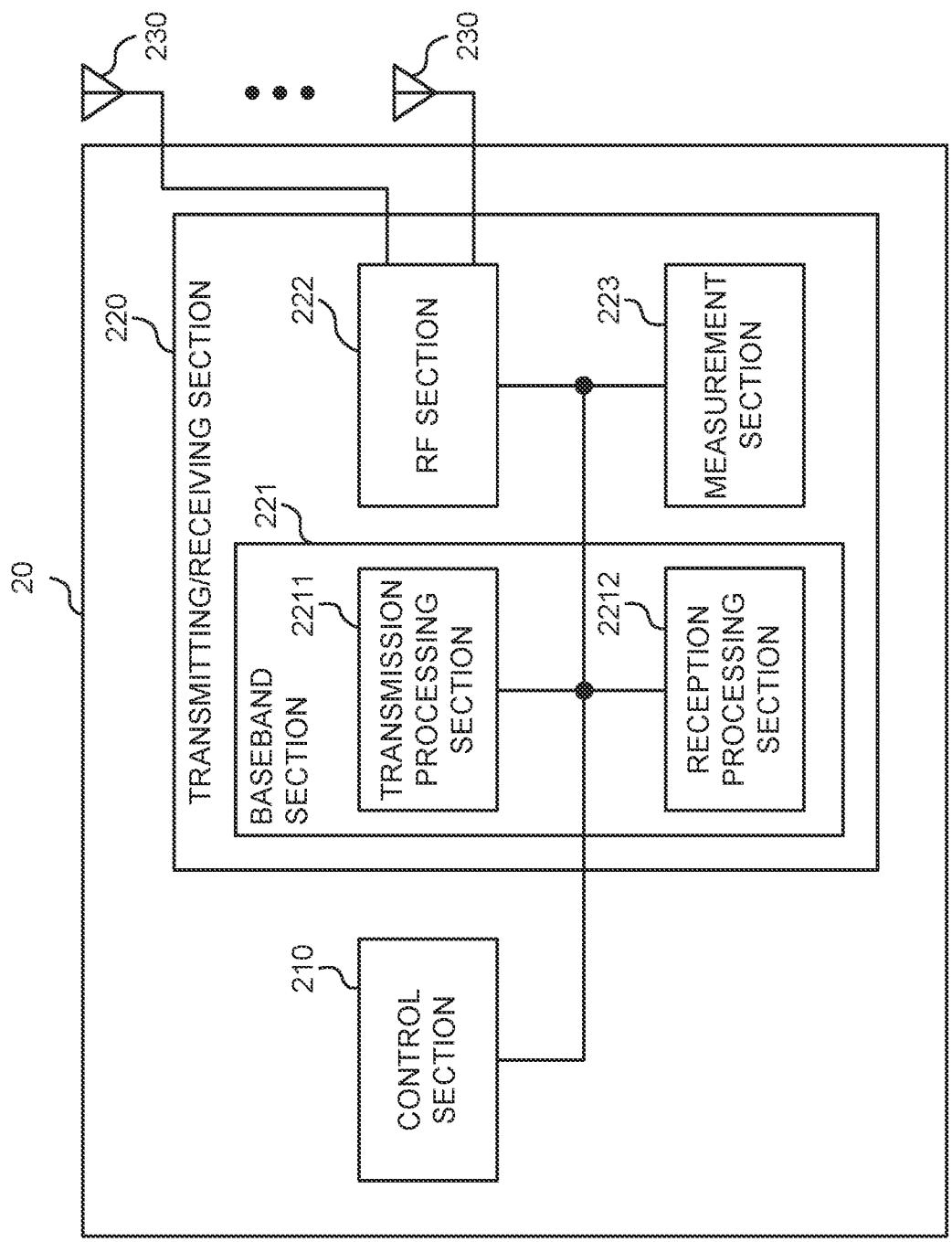
FIG. 9 is a diagram illustrating an example of a configuration of a user terminal according to one embodiment.

FIG. 9 is a diagram illustrating an example of a configuration of the user terminal according to one embodiment. The user terminal 20 includes a control section 210, a transmitting/receiving section 220, and a transmitting/receiving antenna 230. Note that, one or more each of the control sections 210, the transmitting/receiving sections 220, and the transmitting/receiving antennas 230 may be included.

Note that, although this example mainly describes functional blocks of a characteristic part of the present embodiment, it may be assumed that the user terminal 20 includes other functional blocks that are necessary for radio communication as well. Part of processing of each section described below may be omitted.

The control section 210 controls the entire user terminal 20. The control section 210 can include a controller, a control circuit, and the like that are described based on common recognition in the technical field related to the present disclosure.

The control section 210 may control signal generation, mapping, and the like. The control section 210 may control transmission/reception, measurement, and the like using the transmitting/receiving section 220 and the transmitting/receiving antenna 230. The control section 210 may generate data, control information, a sequence, and the like to be transmitted as signals, and may transfer the data, control information, sequence, and the like to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can include a transmitter/receiver, an RF circuit, a baseband circuit, a filter, a phase shifter, a measurement circuit, a transmitting/receiving circuit, and the like that are described based on common recognition in the technical field related to the present disclosure.

The transmitting/receiving section 220 may be formed as an integrated transmitting/receiving section, or may include a transmitting section and a receiving section. The transmitting section may include the transmission processing section 2211 and the RF section 222. The receiving section may include the reception processing section 2212, the RF section 222, and the measurement section 223.

The transmitting/receiving antenna 230 can include an antenna described based on common recognition in the technical field related to the present disclosure, for example, an array antenna.

The transmitting/receiving section 220 may receive the above-described downlink channel, synchronization signal, downlink reference signal, and the like. The transmitting/receiving section 220 may transmit the above-described uplink channel, uplink reference signal, and the like.

The transmitting/receiving section 220 may form at least one of a transmission beam and a reception beam by using digital beam forming (for example, precoding), analog beam forming (for example, phase rotation), and the like.

The transmitting/receiving section 220 (transmission processing section 2211) may perform PDCP layer processing, RLC layer processing (for example, RLC retransmission control), MAC layer processing (for example, HARQ retransmission control), and the like on, for example, data, control information, and the like acquired from the control section 210, to generate a bit string to be transmitted.

The transmitting/receiving section 220 (transmission processing section 2211) may perform transmission processing such as channel encoding (which may include error correction encoding), modulation, mapping, filtering processing, DFT processing (if necessary), IFFT processing, precoding, or digital-analog conversion on the bit string to be transmitted, to output a baseband signal.

Note that, whether or not to apply DFT processing may be determined based on configuration of transform precoding. When the transform precoding is enabled for a channel (for example, PUSCH), the transmitting/receiving section 220 (transmission processing section 2211) may perform DFT processing as the transmission processing to transmit the channel by using a DFT-s-OFDM waveform, and when not, DFT processing does not have to be performed as the transmission processing.

The transmitting/receiving section 220 (RF section 222) may perform modulation to a radio frequency range, filtering processing, amplification, and the like on the baseband signal, to transmit a signal in the radio frequency range via the transmitting/receiving antenna 230.

Meanwhile, the transmitting/receiving section 220 (RF section 222) may perform amplification, filtering processing, demodulation to a baseband signal, and the like on the signal in the radio frequency range received by the transmitting/receiving antenna 230.

The transmitting/receiving section 220 (reception processing section 2212) may apply reception processing such as analog-digital conversion, FFT processing, IDFT processing (if necessary), filtering processing, demapping, demodulation, decoding (which may include error correction decoding), MAC layer processing, RLC layer processing, or PDCP layer processing on the acquired baseband signal, to acquire user data and the like.

The transmitting/receiving section 220 (measurement section 223) may perform measurement on the received signal. For example, the measurement section 223 may perform RRM measurement, CSI measurement, and the like based on the received signal. The measurement section 223 may measure received power (for example, RSRP), received quality (for example, RSRQ, SINR, or SNR), signal strength (for example, RSSI), propagation path information (for example, CSI), and the like. The measurement result may be output to the control section 210.

Note that the transmitting section and the receiving section of the user terminal 20 in the present disclosure may include at least one of the transmitting/receiving section 220, the transmitting/receiving antenna 230, or the transmission line interface 240.

The transmitting/receiving section 220 may receive a configuration of a first reference signal for beam failure detection (BFD) and receive a medium access control-control element (MAC CE). The control section 210 may update the first reference signal based on the MAC CE.

The first reference signal may be associated with one or more control resource sets (CORESETs). The MAC CE may indicate a transmission configuration indication (TCI) state of the one or more CORESETs. The control section 210 may update the first reference signal based on the TCI state (first embodiment).

Each of the one or more CORESETs may be associated with one CORESET pool index (one TRP of the multi-DCI-based multi-TRPs) or one (one TRP of the single-DCI-based multi-TRPs) of two TCI states indicated by downlink control information.

The MAC CE may indicate one or two IDs of the first reference signal (for example, the BFD-RS field). The control section may apply the MAC CE to one or more serving cells (second embodiment).

(Hardware Configuration)

Note that the block diagrams that have been used to describe the above embodiments illustrate blocks in functional units. These functional blocks (components) may be implemented in arbitrary combinations of at least one of hardware or software. Further, the method for implementing each functional block is not particularly limited. That is, each functional block may be implemented by a single apparatus physically or logically aggregated, or may be implemented by directly or indirectly connecting two or more physically or logically separate apparatuses (in a wired manner, a radio manner, or the like, for example) and using these apparatuses. The functional blocks may be implemented by combining software with the above-described single apparatus or the above-described plurality of apparatuses.

Here, the function includes, but is not limited to, determining, judging, calculating, computing, processing, deriving, investigating, searching, ascertaining, receiving, transmitting, outputting, accessing, solving, selecting, choosing, establishing, comparing, assuming, expecting, regarding, broadcasting, notifying, communicating, forwarding, configuring, reconfiguring, allocating, mapping, assigning, and the like. For example, a functional block (component) that has a transmission function may be referred to as a transmitting section (transmitting unit), a transmitter, and the like. In any case, as described above, the implementation method is not particularly limited.

Figure 10:
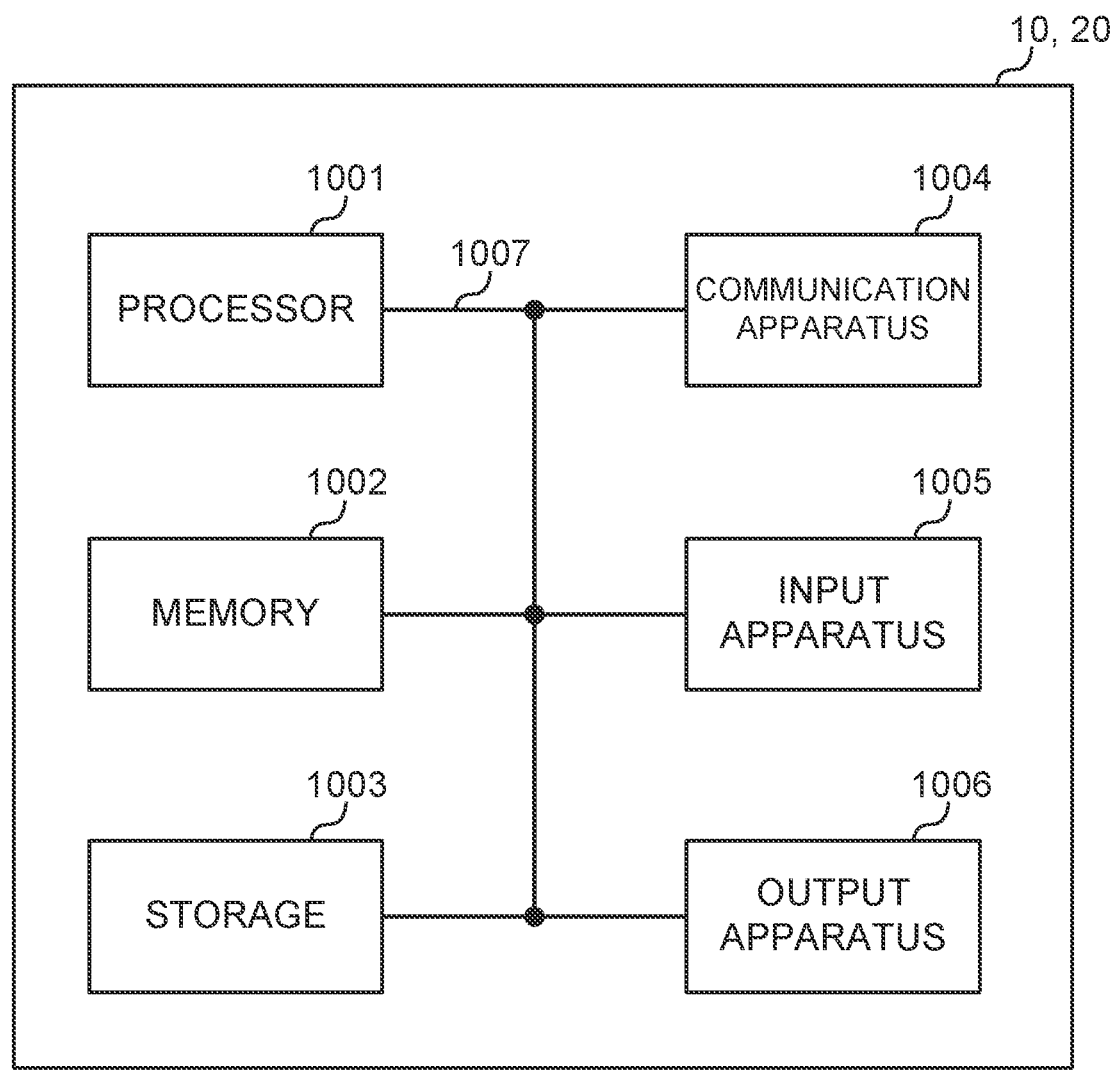
FIG. 10 is a diagram illustrating an example of a hardware configuration of the base station and the user terminal according to one embodiment.

For example, the base station, the user terminal, and the like according to one embodiment of the present disclosure may function as a computer that executes the processing of the radio communication method of the present disclosure. FIG. 10 is a diagram illustrating an example of a hardware configuration of the base station and the user terminal according to one embodiment. Physically, the above-described base station 10 and user terminal 20 may be formed as a computer apparatus that includes a processor 1001, a memory 1002, a storage 1003, a communication apparatus 1004, an input apparatus 1005, an output apparatus 1006, a bus 1007, and the like.

Note that, in the present disclosure, the terms such as an apparatus, a circuit, a device, a section, and a unit can be replaced with one another. The hardware configuration of the base station 10 and the user terminal 20 may be configured to include one or a plurality of apparatuses illustrated in the figures, or may be configured without including some apparatuses.

For example, although only one processor 1001 is illustrated, a plurality of processors may be provided. Further, the processing may be executed by one processor, or the processing may be executed by two or more processors simultaneously or sequentially, or using other methods. Note that the processor 1001 may be implemented with one or more chips.

Each of functions of the base station 10 and the user terminal 20 is implemented by causing given software (program) to be read on hardware such as the processor 1001 and the memory 1002, thereby causing the processor 1001 to perform operation, control communication via the communication apparatus 1004, and control at least one of reading and writing of data in the memory 1002 and the storage 1003.

For example, the processor 1001 may control the whole computer by running an operating system. The processor 1001 may be implemented by a central processing unit (CPU) including an interface with peripheral equipment, a control apparatus, an operation apparatus, a register, and the like. For example, at least a part of the above-described control section 110 (210), transmitting/receiving section 120 (220), and the like may be implemented by the processor 1001.

The processor 1001 reads a program (program code), a software module, and data from at least one of the storage 1003 and the communication apparatus 1004, into the memory 1002, and executes various pieces of processing in accordance therewith. As the program, a program that causes a computer to execute at least a part of the operation described in the above-described embodiment is used. For example, the control section 110 (210) may be implemented by a control program that is stored in the memory 1002 and operates in the processor 1001, and another functional block may be implemented similarly.

The memory 1002 is a computer-readable recording medium, and may include, for example, at least one of a read only memory (ROM), an erasable programmable ROM (EPROM), an electrically EPROM (EEPROM), a random access memory (RAM), and other appropriate storage media. The memory 1002 may be referred to as a register, a cache, a main memory (primary storage apparatus), and the like. The memory 1002 can store a program (program code), a software module, and the like, which can be executed for implementing the radio communication method according to one embodiment of the present disclosure.

The storage 1003 is a computer-readable recording medium, and may include, for example, at least one of a flexible disk, a floppy (registered trademark) disk, a magneto-optical disk (e.g., compact disc ROM (CD-ROM), digital versatile disc, Blu-ray (registered trademark) disk), a removable disk, a hard disk drive, a smart card, a flash memory device (e.g., card, stick, and key drive), a magnetic stripe, a database, a server, and other appropriate storage media. The storage 1003 may be referred to as an auxiliary storage apparatus.

The communication apparatus 1004 is hardware (transmission/reception device) for inter-computer communication via at least one of a wired network and a wireless network, and is also referred to as, for example, a network device, a network controller, a network card, a communication module, and the like. The communication apparatus 1004 may include a high frequency switch, a duplexer, a filter, a frequency synthesizer, and the like in order to implement, for example, at least one of frequency division duplex (FDD) or time division duplex (TDD). For example, the transmitting/receiving section 120 (220), the transmitting/receiving antenna 130 (230), and the like described above may be implemented by the communication apparatus 1004. The transmitting/receiving section 120 (220) may be implemented by physically or logically separated transmitting section 120a (220a) and receiving section 120b (220b).

The input apparatus 1005 is an input device for receiving input from the outside (e.g., keyboard, mouse, microphone, switch, button, and sensor). The output apparatus 1006 is an output device that performs output to the outside (for example, a display, a speaker, a light emitting diode (LED) lamp, or the like). Note that the input apparatus 1005 and the output apparatus 1006 may be provided in an integrated configuration (e.g., touch panel).

Apparatuses such as the processor 1001 and the memory 1002 are connected by the bus 1007 for communicating information. The bus 1007 may include a single bus, or may include buses that differs between apparatuses.

The base station 10 and the user terminal 20 may include hardware such as a microprocessor, a digital signal processor (DSP), an application specific integrated circuit (ASIC), a programmable logic device (PLD), and a field programmable gate array (FPGA), and a part or all of the functional blocks may be implemented by the hardware. For example, the processor 1001 may be implemented by using at least one of these pieces of hardware.

Modifications

Note that terms described in the present disclosure and terms necessary for understanding the present disclosure may be replaced with terms that have the same or similar meanings. For example, a channel, a symbol, and a signal (signal or signaling) may be replaced with one another. Further, the signal may be a message. The reference signal can be abbreviated as an RS, and may be referred to as a pilot, a pilot signal, and the like, depending on which standard applies. A component carrier (CC) may be referred to as a cell, a frequency carrier, a carrier frequency, and the like.

A radio frame may include one or a plurality of durations (frames) in a time domain. Each of the one or more periods (frames) included in the radio frame may be referred to as a subframe. Further, the subframe may include one or more slots in the time domain. The subframe may have a fixed time length (e.g., 1 ms) that does not depend on numerology.

Here, the numerology may be a communication parameter applied to at least one of transmission and reception of a signal or a channel. The numerology may indicate at least one of, for example, subcarrier spacing (SCS), a bandwidth, a symbol length, a cyclic prefix length, a transmission time interval (TTI), the number of symbols per TTI, radio frame configuration, specific filtering processing performed by a transceiver in a frequency domain, and specific windowing processing performed by the transceiver in a time domain.

The slot may include one or a plurality of symbols (orthogonal frequency division multiplexing (OFDM) symbol, single carrier frequency division multiple access (SC-FDMA) symbol, and the like) in the time domain. The slot may be a time unit based on the numerology.

The slot may include a plurality of mini slots. Each mini slot may include one or more symbols in the time domain. Further, the mini slot may be referred to as a sub-slot. Each mini slot may include fewer symbols than the slot. A PDSCH (or PUSCH) transmitted in a time unit larger than the mini slot may be referred to as "PDSCH (PUSCH) mapping type A". A PDSCH (or PUSCH) transmitted by using a mini slot may be referred to as a PDSCH (PUSCH) mapping type B.

A radio frame, a subframe, a slot, a mini slot, and a symbol all represent a time unit at the time of transmitting a signal. The radio frame, the subframe, the slot, the mini slot, and the symbol may be called by other applicable names, respectively. Note that time units such as a frame, a subframe, a slot, a mini slot, and a symbol in the present disclosure may be replaced with one another.

For example, one subframe may be referred to as a TTI, a plurality of consecutive subframes may be referred to as a TTI, or one slot or one mini slot may be referred to as a TTI. That is, at least one of the subframe or the TTI may be a subframe (1 ms) in the existing LTE, may be a period shorter than 1 ms (for example, one to thirteen symbols), or may be a period longer than 1 ms. Note that the unit to represent the TTI may be referred to not as a subframe but as a slot, a mini slot, and the like.

Here, the TTI refers to a minimum time unit of scheduling in radio communication, for example. For example, in the LTE system, a base station performs scheduling to allocate radio resources (a frequency bandwidth, transmit power, and the like that can be used in each user terminal) to each user terminal in TTI units. Note that the definition of the TTI is not limited thereto.

The TTI may be a transmission time unit of channel-encoded data packets (transport blocks), code blocks, codewords, and the like, or may be a processing unit in scheduling, link adaptation, and the like. Note that, when a TTI is given, a time section (e.g., number of symbols) in which a transport block, a code block, a codeword, and the like are actually mapped may be shorter than the TTI.

Note that, when one slot or one mini slot is referred to as a TTI, one or more TT's (i.e., one or more slots or one or more mini slots) may be the minimum time unit of scheduling. The number of slots (number of mini slots) constituting the minimum time unit of scheduling may be controlled.

A TTI having a time length of 1 ms may be referred to as a usual TTI (TTI in 3GPP Rel. 8 to 12), a normal TTI, a long TTI, a usual subframe, a normal subframe, a long subframe, a slot, and the like. A TTI shorter than the usual TTI may be referred to as a shortened TTI, a short TTI, a partial TTI (or fractional TTI), a shortened subframe, a short subframe, a mini slot, a subslot, a slot, and the like.

Note that a long TTI (e.g., usual TTI and subframe) may be replaced with a TTI having a time length exceeding 1 ms, and a short TTI (e.g., shortened TTI) may be replaced with a TTI having a TTI length less than the TTI length of a long TTI and equal to or more than 1 ms.

A resource block (RB) is a unit of resource allocation in a time domain and a frequency domain, and may include one or a plurality of consecutive subcarriers in the frequency domain. The number of subcarriers included in the RB may be the same regardless of the numerology, and may be twelve, for example. The number of subcarriers in the RB may be determined based on the numerology.

The RB may include one or a plurality of symbols in the time domain, and may have a length of one slot, one mini slot, one subframe, or one TTI. Each of one TTI, one subframe, and the like may include one or a plurality of resource blocks.

Note that one or a plurality of RBs may be referred to as a physical resource block (PRB), a sub-carrier group (SCG), a resource element group (REG), a PRB pair, an RB pair, and the like.

The resource block may include one or a plurality of resource elements (REs). For example, one RE may be a radio resource domain of one subcarrier and one symbol.

A bandwidth part (BWP) (which may be referred to as partial bandwidth and the like) may represent a subset of consecutive common resource blocks (RBs) for a numerology in a carrier. Here, the common RB may be specified by the index of the RB based on a common reference point of the carrier. The PRB may be defined in a BWP, and be numbered in the BWP.

The BWP may include a UL BWP (BWP for UL) and a DL BWP (BWP for DL). For the UE, one or a plurality of BWPs may be configured in one carrier.

At least one of the configured BWPs may be active, and it need not be assumed that the UE transmits/receives a given signal/channel outside the active BWP. Note that "cell", "carrier", etc. in the present disclosure may be replaced with "BWP".

Note that the structures of the above-described radio frame, subframe, slot, mini slot, symbol, and the like are merely examples. For example, configurations such as the number of subframes in a radio frame, the number of slots per subframe or radio frame, the number of mini slots in a slot, the number of symbols and RBs in a slot or a mini slot, the number of subcarriers in an RB, the number of symbols in a TTI, a symbol length, a cyclic prefix (CP) length, and the like can be variously changed.

The information, parameters, and the like described in the present disclosure may be represented by using an absolute value, a relative value from a given value, or other corresponding information. For example, radio resources may be instructed by a given index.

The names used for parameters and the like in the present disclosure are in no respect limitations. Further, any mathematical expression or the like that uses these parameters may differ from those explicitly disclosed in the present disclosure. Since various channels (e.g., PUCCH and PDCCH) and information elements can be identified by any suitable name, various names allocated to these various channels and information elements are in no respect limitations.

The information, signals, and the like described in the present disclosure may be represented by using any of a variety of different pieces of technology. For example, data, instructions, commands, information, signals, bits, symbols, and chips, which may be referenced throughout the above description, may be represented by voltages, currents, electromagnetic waves, magnetic fields or particles, optical fields or photons, or any combination thereof.

The information, signals, and the like can be output in at least one of a direction from a higher layer to a lower layer and a direction from a lower layer to a higher layer. The information, signals, and the like may be input/output via a plurality of network nodes.

The input/output information, signals, and the like may be stored in a specific location (e.g., in memory), or may be managed by using a management table. The input/output information, signals, and the like can be overwritten, updated, or appended. The output information, signals, and the like may be deleted. The input information, signals, and the like may be transmitted to another apparatus.

Information may be announced not only in the aspect/embodiments described in the present disclosure but in another method. For example, information may be announced in the present disclosure by physical layer signaling (e.g., downlink control information (DCI), uplink control information (UCI)), higher layer signaling (e.g., radio resource control (RRC) signaling, broadcast information (master information block (MIB), system information block (SIB), and the like), medium access control (MAC) signaling), another signal, or a combination thereof.

Note that the physical layer signaling may be referred to as layer 1/layer 2 (L1/L2) control information (L1/L2 control signal), L1 control information (L1 control signal), and the like. Further, the RRC signaling may be referred to as an RRC message, and may be, for example, an RRC Connection Setup message, an RRC Connection Reconfiguration message, and so on. The MAC signaling may be announced by using, for example, a MAC control element (CE).

Given information may be announced (e.g., "being X" may be announced) not only explicitly but implicitly (e.g., by not reporting the given information, or by reporting other information).

Decisions may be made in a value represented by one bit (0 or 1), in a Boolean value represented by true or false, or in comparison of numerical values (e.g., comparison against a given value).

Regardless of being referred to as software, firmware, middleware, a microcode, or a hardware description language, or by other names, software should be interpreted broadly so as to mean instructions, instruction sets, codes, code segments, program codes, programs, subprograms, software modules, applications, software applications, software packages, routines, subroutines, objects, executable files, execution threads, procedures, functions, and the like.

The software, instructions, information, and the like may be transmitted/received via a transmission medium. For example, when software is transmitted from a website, a server, or another remote source by using at least one of wired technology (e.g., coaxial cable, optical fiber cable, twisted pair, and digital subscriber line (DSL)) and wireless technology (e.g., infrared rays and microwaves), at least one of the wired technology and the wireless technology is included in the definition of the transmission medium.

The terms "system" and "network" used in the present disclosure can be interchangeably used. The "network" may mean an apparatus (e.g., base station) included in a network.

In the present disclosure, terms such as "precoding", "precoder", "weight (precoding weight)", "quasi-co-location (QCL)", "transmission configuration indication state (TCI state)", "spatial relation", "spatial domain filter", "transmit power", "phase rotation", "antenna port", "antenna port group", "layer", "number of layers", "rank", "resource", "resource set", "resource group", "beam", "beam width", "beam angle", "antenna", "antenna element", and "panel" can be interchangeably used.

In the present disclosure, terms such as "base station (BS)", "radio base station", "fixed station", "NodeB", "eNodeB (eNB)", "gNodeB (gNB)", "access point", "transmission point (TP)", "reception point (RP)", "transmission/reception point (TRP)", "panel", "cell", "sector", "cell group", "carrier", and "component carrier" can be interchangeably used. The base station may be referred to by a term such as a macro cell, a small cell, a femto cell, and a pico cell.

The base station can accommodate one or a plurality of (e.g., three) cells. In a case where the base station accommodates a plurality of cells, the entire coverage area of the base station can be partitioned into a plurality of smaller areas, and each smaller area can provide communication services through a base station subsystem (for example, small base station for indoors (remote radio head (RRH))). The term "cell" or "sector" refers to a part or the whole of a coverage area of at least one of a base station and a base station subsystem that perform communication service in the coverage.

In the present disclosure, the terms such as "mobile station (MS)", "user terminal", "user equipment (UE)", and "terminal" can be interchangeably used.

The mobile station may be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, or a client, or by other appropriate terms.

At least one of the base station and the mobile station may be referred to as a transmission apparatus, a reception apparatus, a radio communication apparatus, and the like. Note that at least one of the base station or the mobile station may be a device mounted on a moving object, a moving object itself, and the like. The moving object may be a transportation (for example, a car, an airplane, or the like), an unmanned moving object (for example, a drone, an autonomous car, or the like), or a (manned or unmanned) robot. Note that at least one of the base station or the mobile station also includes an apparatus that does not necessarily move during a communication operation. For example, at least one of the base station and the mobile station may be an Internet of Things (IoT) device such as a sensor.

The base station in the present disclosure may be replaced with a user terminal. For example, each aspect/embodiment of the present disclosure may be applied to a configuration in which communication between the base station and the user terminal is replaced with communication among a plurality of user terminals (which may be referred to as, for example, device-to-device (D2D), vehicle-to-everything (V2X), and the like). In this case, the user terminal 20 may have the function of the above-described base station 10. In addition, the terms such as "uplink" and "downlink" may be replaced with terms corresponding to terminal-to-terminal communication (for example, "sidelink"). For example, an uplink channel, a downlink channel, and the like may be replaced with a sidelink channel.

Similarly, the user terminal in the present disclosure may be replaced with a base station. In the case, the base station 10 may have the function of the above-mentioned user terminal 20.

In the present disclosure, the operation performed by the base station may be performed by an upper node thereof in some cases. In a network including one or a plurality of network nodes with a base station, it is clear that various operations performed for communication with a terminal can be performed by a base station, one or more network nodes (e.g., mobility management entity (MME) and serving-gateway (S-GW) are possible, but are not limitations) other than the base station, or a combination thereof.

Each aspect/embodiment described in the present disclosure may be used alone, used in combination, or switched in association with execution. Further, the order of processing procedures, sequences, flowcharts, and the like of the aspects/embodiments described in the present disclosure may be re-ordered as long as there is no inconsistency. For example, for the method described in the present disclosure, various step elements are presented by using an illustrative order, and the method is not limited to the presented specific order.

Each aspect/embodiment described in the present disclosure may be applied to a system using Long-Term Evolution (LTE), LTE-Advanced (LTE-A), LTE-beyond (LTE-B), SUPER 3G, IMT-Advanced, 4th generation mobile communication system (4G), 5th generation mobile communication system (5G), 6th generation mobile communication system (6G), xth generation mobile communication system (xG) (xG(x is, for example, an integer or decimal)), Future Radio Access (FRA), New-Radio Access Technology (RAT), New Radio (NR), New radio access (NX), Future generation radio access (FX), Global System for Mobile communications (GSM (registered trademark)), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), or another appropriate radio communication method, a next generation system expanded based on the foregoing, and the like. Further, a plurality of systems may be combined (for example, a combination of LTE or LTE-A and 5G, and the like) and applied.

The phrase "based on" used in the present disclosure does not mean "based on only", unless otherwise specified. In other words, the term "based on" means both "only based on" and "at least based on".

Any reference to an element using designations such as "first" and "second" used in the present disclosure does not generally limit the amount or order of these elements. These designations can be used in the present disclosure, as a convenient way of distinguishing between two or more elements. Reference to the first and second elements does not imply that only two elements may be adopted, or that the first element must precede the second element in some way.

The term "determining" used in the present disclosure may include a wide variety of operations. For example, "determining" may be regarded as "determining" judging, calculating, computing, processing, deriving, investigating, looking up, search, inquiry (e.g., looking up in table, database, or another data structure), ascertaining, and the like.

"Determining" may be regarded as determining receiving (e.g., receiving information), transmitting (e.g., transmitting information), inputting, outputting, accessing (e.g., accessing data in memory), and the like.

"Determining" may be regarded as determining resolving, selecting, choosing, establishing, comparing, and the like. That is, "determining" may be regarded as "determining" some operations.

"Determining" may be replaced with "assuming", "expecting", "considering", and the like.

The "maximum transmit power" described in the present disclosure may mean the maximum value of the transmit power, may mean the nominal UE maximum transmit power, or may mean the rated UE maximum transmit power.

The terms "connected" and "coupled" used in the present disclosure, or all variations thereof mean all direct or indirect connections or coupling between two or more elements, and can include the presence of one or more intermediate elements between two elements "connected" or "coupled" with each other. The coupling or connection between the elements may be physical, logical, or a combination of these. For example, the term "connection" is interchangeable with "access".

In the present disclosure, when two elements are connected, the two elements can be considered to be "connected" or "coupled" with each other by using one or more electrical wires, cables, printed electrical connections, and the like, and using, as some non-limiting and non-inclusive examples, electromagnetic energy and the like having a wavelength in a radio frequency domain, a microwave domain, and an optical (both visible and invisible) domain.

In the present disclosure, the phrase "A and B are different" may mean "A and B are different from each other". Note that the phrase may mean that "A and B are different from C". The terms such as "leave", "coupled", and the like may be interpreted similarly to "different".

In the present disclosure, when "include", "including", and variations thereof are used, these terms are intended to be inclusive similarly to the term "comprising". The term "or" used in the present disclosure is intended not to be an exclusive-OR.

In the present disclosure, when articles in English such as "a", "an", and "the" are added in translation, the present disclosure may include the plural forms of nouns that follow these articles.

Although the invention according to the present disclosure has been described in detail above, it is obvious to a person skilled in the art that the invention according to the present disclosure is by no means limited to the embodiments described in the present disclosure. The invention according to the present disclosure can be embodied with various corrections and in various modified aspects, without departing from the spirit and scope of the invention defined based on the description of claims. Consequently, the description of the present disclosure is provided only for the purpose of explaining examples, and should by no means be construed to limit the invention according to the present disclosure in any way.

The invention claimed is:

1. A terminal comprising:
   a receiver that receives a configuration of a plurality of reference signals for beam failure detection (BFD), the plurality of reference signals being respectively associated with a plurality of transmission/reception points (TRPs), and receives a medium access control-control element (MAC CE); and
   a processor that activates, among the plurality of reference signals, at least one reference signal per TRP, based on the MAC CE,
   wherein the MAC CE that activates the at least one reference signal per TRP is defined for updating a BFD-reference signal (BFD-RS) and is distinct from a MAC CE used for a transmission configuration indication (TCI) state indication for UE-specific physical downlink control channel (PDCCH), and
   wherein the MAC CE includes a field that indicates whether there is one reference signal field per TRP or two reference signal fields per TRP.

2. The terminal according to claim 1, wherein the MAC CE has a logical channel ID (LCID) that identifies that the MAC CE activates the at least one reference signal per TRP.

3. The terminal according to claim 1, further comprising a transmitter that reports UE capability indicating that activation of at least one reference signal based on the MAC CE is supported per TRP.

4. A radio communication method for a terminal, comprising:
   receiving a configuration of a plurality of reference signals for beam failure detection (BFD), the plurality of reference signals being respectively associated with a plurality of transmission/reception points (TRPs), and receiving a medium access control-control element (MAC CE); and
   activating, among the plurality of reference signals, at least one reference signal per TRP, based on the MAC CE,
   wherein the MAC CE that activates the at least one reference signal per TRP is defined for updating a BFD-reference signal (BFD-RS) and is distinct from a MAC CE used for a transmission configuration indication (TCI) state indication for UE-specific physical downlink control channel (PDCCH), and wherein the MAC CE includes a field that indicates whether there is one reference signal field per TRP or two reference signal fields per TRP.

5. A base station comprising:

a transmitter that transmits a configuration of a plurality of reference signals for beam failure detection (BFD), the plurality of reference signals being respectively associated with a plurality of transmission/reception points (TRPs), and transmits a medium access control-control element (MAC CE); and a processor that activates, among the plurality of reference signals, at least one reference signal per TRP, based on the MAC CE, wherein the MAC CE that activates the at least one reference signal per TRP is defined for updating a BFD-reference signal (BFD-RS) and is distinct from a MAC CE used for a transmission configuration indication (TCI) state indication for UE-specific physical downlink control channel (PDCCH), and wherein the MAC CE includes a field that indicates whether there is one reference signal field per TRP or two reference signal fields per TRP.

6. A system comprising a terminal and a base station, wherein the terminal comprises:

a receiver that receives a configuration of a plurality of reference signals for beam failure detection (BFD), the plurality of reference signals being respectively associated with a plurality of transmission/reception points (TRPs), and receives a medium access control-control element (MAC CE); and a processor that activates, among the plurality of reference signals, at least one reference signal per TRP, based on the MAC CE, wherein the MAC CE that activates the at least one reference signal per TRP is defined for updating a BFD-reference signal (BFD-RS) and is distinct from a MAC CE used for a transmission configuration indication (TCI) state indication for UE-specific physical downlink control channel (PDCCH), and wherein the MAC CE includes a field that indicates whether there is one reference signal field per TRP or two reference signal fields per TRP, and the base station comprises:

a transmitter that transmits the configuration, and transmits the MAC CE; and a processor that activates, based on the MAC CE, the at least one reference signal.

* * * * *